(12) United States Patent
Arai et al.

(10) Patent No.: US 9,344,632 B2
(45) Date of Patent: May 17, 2016

(54) AV SYSTEM

(75) Inventors: Kanehide Arai, Tokyo (JP); Yasushi Fujii, Kobe (JP); Makoto Oi, Kobe (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 609 days.

(21) Appl. No.: 13/806,613

(22) PCT Filed: Oct. 6, 2010

(86) PCT No.: PCT/JP2010/005992
§ 371 (c)(1),
(2), (4) Date: Dec. 21, 2012

(87) PCT Pub. No.: WO2012/046276
PCT Pub. Date: Apr. 12, 2012

(65) Prior Publication Data
US 2013/0088581 A1  Apr. 11, 2013

(51) Int. Cl.
| | |
|---|---|
| *H04N 13/04* | (2006.01) |
| *G06T 7/00* | (2006.01) |
| *H04N 5/232* | (2006.01) |
| *H04S 7/00* | (2006.01) |
| *H04N 5/66* | (2006.01) |

(52) U.S. Cl.
CPC .......... *H04N 5/23293* (2013.01); *G06T 7/0042* (2013.01); *H04N 5/66* (2013.01); *H04N 13/0429* (2013.01); *H04S 7/304* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 6,417,969 B1* | 7/2002 | DeLuca et al. | 359/630 |
| 6,850,252 B1* | 2/2005 | Hoffberg | 715/716 |
| 8,126,157 B2* | 2/2012 | Buil et al. | 381/74 |
| 8,926,475 B2* | 1/2015 | Lin et al. | 482/8 |
| 2004/0252205 A1* | 12/2004 | Onoda | 348/231.3 |
| 2005/0125123 A1 | 6/2005 | Kageyama | |
| 2005/0234619 A1 | 10/2005 | Uemura et al. | |
| 2006/0200253 A1* | 9/2006 | Hoffberg et al. | 700/19 |
| 2008/0118156 A1* | 5/2008 | Okada | 382/195 |
| 2008/0207296 A1* | 8/2008 | Lutnick et al. | 463/16 |
| 2008/0231926 A1* | 9/2008 | Klug et al. | 359/23 |
| 2008/0285854 A1* | 11/2008 | Kotake et al. | 382/190 |
| 2010/0092079 A1* | 4/2010 | Aller | 382/165 |
| 2010/0097483 A1* | 4/2010 | Icho et al. | 348/222.1 |

(Continued)

FOREIGN PATENT DOCUMENTS

| | | |
|---|---|---|
| JP | 2000-278626 A | 10/2000 |
| JP | 2003-25911 A | 1/2003 |
| JP | 2004-48601 A | 2/2004 |

(Continued)

*Primary Examiner* — Jay Patel
*Assistant Examiner* — Reza Aghevli
(74) *Attorney, Agent, or Firm* — Birch, Stewart, Kolasch & Birch, LLP

(57) ABSTRACT

An AV system that executes image recognition of an identification mark 9 provided on headphones 8 in a seat side shot image taken with a camera 2, calculates the coordinate position of the identification mark 9 in the shot image, decides from the coordinate position of the identification mark 9 as to which one of a plurality of seats a user wearing the headphones 8 sits on, and transmits audio data which corresponds to video data to be displayed on the display screen facing the seat, as to which a decision is made that the user sits on, to the headphones 8 to be produced as audio output.

7 Claims, 22 Drawing Sheets

(56) References Cited

U.S. PATENT DOCUMENTS

| | | | |
|---|---|---|---|
| 2010/0118200 A1* | 5/2010 | Gelman et al. | 348/578 |
| 2010/0149100 A1* | 6/2010 | Meiby | 345/168 |

FOREIGN PATENT DOCUMENTS

| | | | | |
|---|---|---|---|---|
| JP | 2005-170138 A | 6/2005 | | |
| JP | 2005-254928 A | 9/2005 | | |
| JP | 2006-14199 A | 1/2006 | | |
| JP | 4042112 B2 | 2/2006 | | |
| JP | 2006-88953 A | 4/2006 | | |
| JP | 2006-133665 A | 5/2006 | | |
| JP | 2006-1336655 | * 5/2006 | | G02B 26/27 |
| JP | 2006-287730 A | 10/2006 | | |
| JP | 2007-8289 A | 1/2007 | | |
| JP | 2009-224841 A | 10/2009 | | |
| JP | 2010-123085 A | 6/2010 | | |

* cited by examiner

AV SYSTEM

TECHNICAL FIELD

The present invention relates to an AV (audio-visual) system for providing a rear seat passenger with video and audio rear seat entertainment (RSE), for example.

BACKGROUND ART

Among RSE systems in vehicles with large seating capacity such as large-sized vehicles or aircraft, there are some that configure a plurality of video-audio reproduction series by providing each rear seat with a display. For example, in 2-series RSE mounted on right and left seats, right and left displays reproduce different videos and audios so that right and left rear seat passengers can view display contents on the displays and listen to audio signals corresponding to the contents by wearing headphones corresponding to the reproduction series. Incidentally, in this configuration, it is necessary to identify the headphones corresponding to the individual reproduction series. Generally, the headphones have a switch for setting one of the right and left channels to be reproduced so that a passenger can decide on which reproduction series the headphones correspond to, right or left, by a manual operation of the switch.

On the other hand, as a conventional technique for identifying the headphones corresponding to the individual reproduction series without any manual operation of a passenger, Patent Document 1 discloses a system that carries out video and audio reproduction by assigning an ID unique to each wireless headphones, by providing the wireless headphones with an infrared communication unit corresponding to the ID, and by causing the system to identify the headphones corresponding to the reproduction series by referring to the ID delivered from the infrared communication unit.

In addition, Patent Document 2 discloses a system that provides the headphones with a dedicated communication unit with directivity besides a communication unit for receiving an audio signal, in which the dedicated communication unit selects an identification signal in accordance with the directivity from a plurality of identification signals received from the directions of a plurality of displays.

In the foregoing conventional system, it is necessary to provide the switch which is a dedicated hardware component for identifying the headphones. Accordingly, it has a problem of being unable to employ general-purpose headphones, and a troublesome problem of always causing a passenger to do manual operation.

In addition, the conventional system typified by the Patent Document 1 or 2 has a problem in that although it can identify the headphones automatically on the system side, it must provide the headphones with the dedicated communication unit, and hence it cannot employ the general-purpose wireless headphones with a function of audio signal communication.

The present invention is implemented to solve the foregoing problems. Therefore it is an object of the present invention to provide an AV system capable of automatically identifying a device corresponding to the individual reproduction series without impairing the versatility of the device used for video-audio reproduction of the individual reproduction series in an AV system with a plurality of video-audio reproduction series.

PRIOR ART DOCUMENT

Patent Document

Patent Document 1: Japanese Patent Laid-Open No. 2007-8289.
Patent Document 2: Japanese Patent Laid-Open No. 2006-287730.

DISCLOSURE OF THE INVENTION

An AV system in accordance with the present invention comprises: a plurality of display units with their display screens being directed to a plurality of seats adjacent to each other; a camera unit for shooting the seats to which the display screens face; an image recognizing unit for executing image recognition of an identification mark provided on an audio output device in a shot image taken with the camera unit, and for calculating a coordinate position of the identification mark in the shot image; a deciding unit for deciding from the coordinate position of the identification mark calculated by the image recognizing unit as to which one of the plurality of seats a user wearing the audio output device sits on; an AV reproducing unit for reproducing video data and audio data; and an audio communication unit for transmitting, from among the audio data reproduced by the AV reproducing unit, the audio data which corresponds to the video data to be displayed on the display screen facing the seat as to which the deciding unit decides that the user sits on, to the audio output device the user wears to be produced as audio output.

According to the present invention, it executes image recognition of the identification mark provided on the audio output device in the seat side shot image taken with the camera unit; calculates the coordinate position of the identification mark in the shot image; decides from the coordinate position of the identification mark as to which one of the plurality of seats the user wearing the audio output device sits on; and transmits the audio data which corresponds to the video data to be displayed on the display screen facing the seat as to which a decision is made that the user sits on, to the audio output device the user wears to be produced as the audio output. This makes it unnecessary to use a dedicated device as the audio output device, thereby offering an advantage of being able to identify the device corresponding to the individual reproduction series automatically without impairing the versatility of the device.

BEST MODE FOR CARRYING OUT THE INVENTION

The best mode for carrying out the invention will now be described with reference to the accompanying drawings to explain the present invention in more detail.

Embodiment 1

Figure 1:
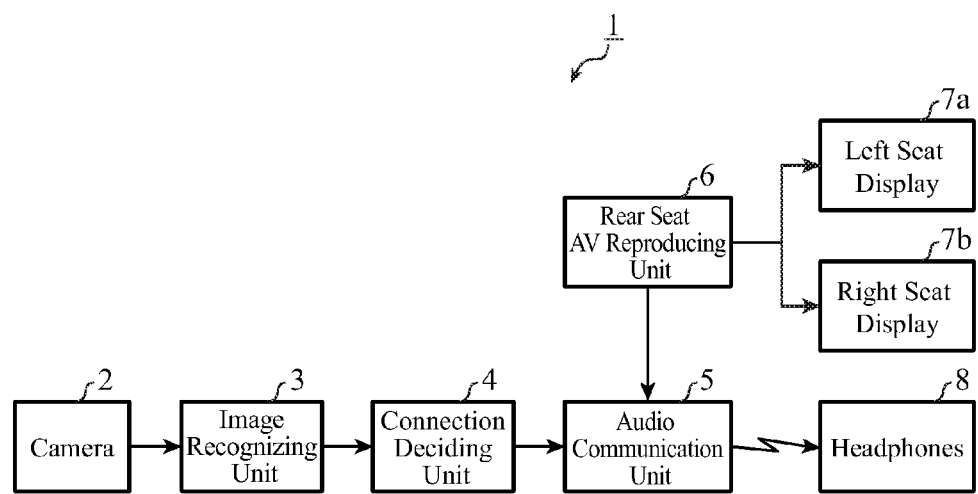
FIG. 1 is a block diagram showing a configuration of an AV system of an embodiment 1 in accordance with the present invention.

FIG. 1 is a block diagram showing a configuration of the AV system of an embodiment 1 in accordance with the present invention, in which the present invention is applied to an RSE system comprising two reproduction series capable of reproducing different videos and audios with displays mounted on right and left seats of a vehicle.

Incidentally, although the present invention is applicable to an AV system with three of more reproduction series, the following description will be made by way of example of the AV system with two reproduction series to facilitate explanation.

In addition, although the following description is made by way of example that applies the present invention to an RSE system, the present invention is also applicable to an AV system that provides a viewer with a video accompanied with an audio as viewing contents and that provides with viewing contents of a plurality of series. Here, the term "provides with viewing contents of a plurality of series" refers to providing individual viewing contents by comprising a plurality of display units with their screens facing a plurality of seats in a vehicle such as a car or plane, respectively, and an audio output device to be worn by a user sitting on a seat.

As shown in FIG. 1, in the RSE system 1, a left seat display 7a and a right seat display 7b reproduce videos, and headphones 8 corresponding to one of the displays 7a and 7b output audios corresponding to the display contents on the displays. As its configuration, the RSE system 1 comprises a camera 2, an image recognizing unit 3, a connection deciding unit 4, an audio communication unit 5 and a rear seat AV reproducing unit 6.

The camera (camera unit) 2 is one for shooting the left and right rear seats facing to the left seat display 7a and right seat display 7b. The camera 2 is mounted at the intermediate point of the left seat display 7a and right seat display 7b so that the image areas of the left and right rear seats have equal dimensions on a shot image as will be described later with reference to FIG. 3, for example.

Incidentally, in the image recognition which will be described later, since the image areas of the left and right rear seats need not always be equal in size, the camera 2 can be mounted at a location that can provide a shooting range that will enable distinction between the image areas of the left and right rear seats on the shot image.

In addition, as the mounting position of the camera 2, the ceiling of the vehicle is conceivable besides the intermediate point between the displays 7a and 7b.

The image recognizing unit 3 is a component for executing image recognition of shot image data acquired from the camera 2, and for calculating the coordinate position of an identification mark on the headphones 8 in the shot image. For example, it calculates the coordinate position of the identification mark in the shot image by registering an image pattern of the identification mark in the image recognizing unit 3 in advance and by matching the image pattern with the shot image. Incidentally, considering movement to a new seat of the passenger wearing the headphones 8, the coordinate position of the identification mark can be calculated from a result of real time shooting with the camera 2.

The connection deciding unit (deciding unit) 4 is a component for deciding from the coordinate position of the identification mark calculated by the image recognizing unit 3 as to which one of the left and right rear seats a passenger wearing the headphones 8 sits on, that is, which one of the audio channels for the displays 7a and 7b is to be connected to the headphones 8. For example, it divides a rear seat side shot image taken with the camera 2 from a fixed point into an image area corresponding to the left rear seat and an image area corresponding to the right rear seat in advance, and decides as to which one of the display audio channels is to be connected to the headphones 8 in accordance with in which one of the image areas the coordinate position of the identification mark is.

Since the rear seat on the right seen from the shooting portion of the camera 2 is facing the left seat display 7a, when the coordinate position of the identification mark is in the image area of the right rear seat, the headphones 8 are connected to the audio channel for the left seat display 7a.

On the contrary, since the rear seat on the left seen from the shooting portion of the camera 2 is facing the right seat display 7b, when the coordinate position of the identification mark is in the image area of the left rear seat, the headphones 8 are connected to the audio channel for the right seat display 7b.

The audio communication unit 5 is a component for establishing a connection between the headphones 8 and the audio channel corresponding to the decision result of the connection deciding unit 4, and for transmitting the audio signal reproduced by the rear seat AV reproducing unit 6 to the headphones 8 by wireless communications. As wireless communications, there are short range wireless communications such as Bluetooth (registered trademark).

The rear seat AV reproducing unit (AV reproducing unit) 6 is a component for reproducing the content data such as a video, audio or text information read out of a storage (such as a CD, DVD or flash memory) not shown, and has independent reproduction series on the left seat display 7a side and right seat display 7b side. In other words, the rear seat AV reproducing unit 6 can reproduce different content data for the reproduction series corresponding to the left seat display 7a and the reproduction series corresponding to the right seat display 7b.

The left seat display (display unit) 7a is a display mounted on the back of the left front seat seen from the rear seat side, and the right seat display (display unit) 7b is a display mounted on the back of the right front seat seen from the rear seat side.

The headphones (audio output device) 8 are headphones for outputting in audio the audio signal received from the audio communication unit 5 by wireless communications, to which general-purpose headphones with a wireless communication function with the audio communication unit 5 are applicable. In addition, as an audio output device of the present invention, not only headphones but also an audio output headset can be employed which is worn on the head of a passenger.

Incidentally, on the external surface of the headphones 8, an identification mark which will be described later is fixed. The image recognition of the identification mark in a shot image enables the identification of the headphones 8 the RSE system 1 employs, and enables from the coordinate position in the shot image the identification as to which one of the displays 7a and 7b the passenger wearing the headphones 8 views.

As the identification mark, it can be printed on the external surface of headphones 8, or an LED (Light Emitting Diode) which is turned on in the identification processing can be provided.

Next, the operation will be described.

Figure 2:
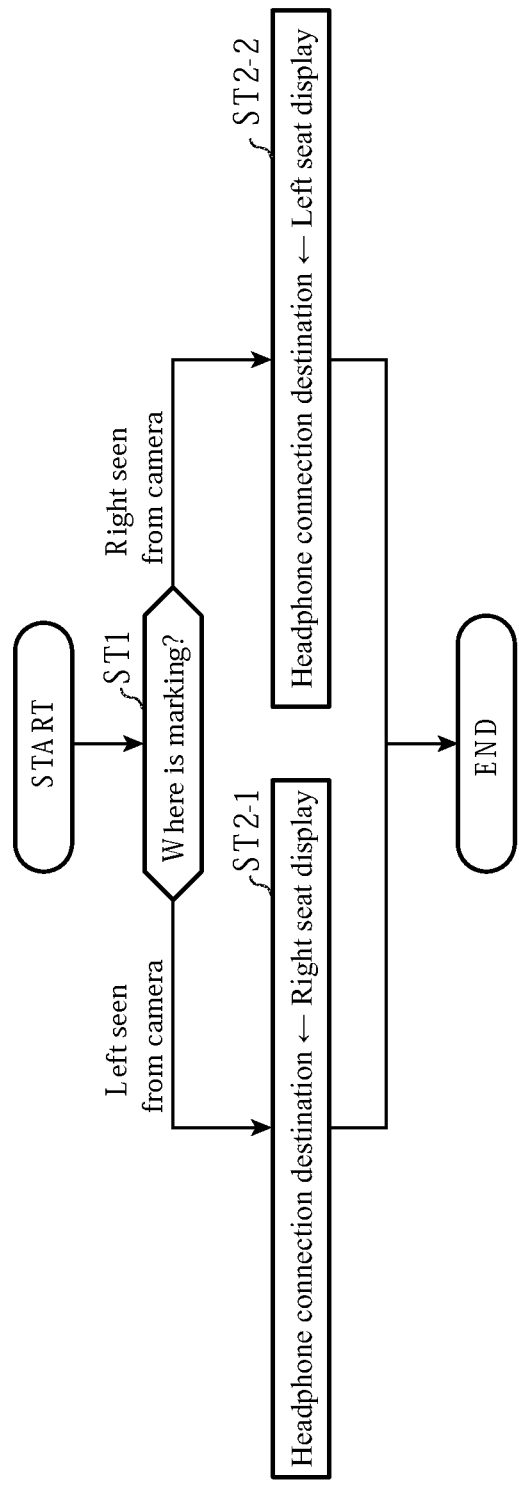
FIG. 2 is a flowchart showing a flow of the operation of the AV system of the embodiment 1.
Figure 3:
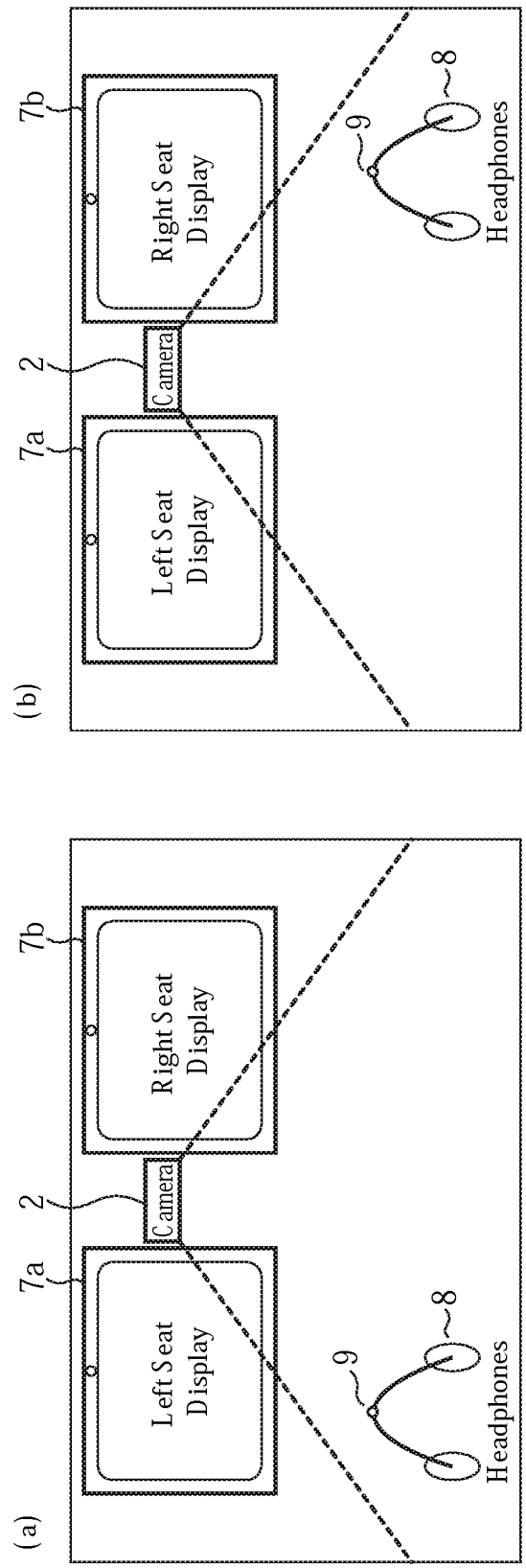
FIG. 3 is a schematic diagram showing deciding processing of the connection destination of headphones.

FIG. 2 is a flowchart showing a flow of the operation of the AV system of the embodiment 1, which shows details of the processing of deciding as to which one of the audio channels for the displays is to be connected to the headphones 8. In addition, FIG. 3 is a schematic diagram showing deciding processing of the connection destination of the headphones: FIG. 3(a) shows a case where the passenger wearing the headphones 8 sits on the rear seat facing the left seat display 7a; and FIG. 3(b) shows a case where the passenger wearing the headphones 8 sits on the rear seat facing the right seat display 7b. Referring to FIG. 3, the processing will be described along the line of FIG. 2.

When the passenger wearing the headphones 8 sits on the rear seat facing the left seat display 7a or right seat display 7b and instructs the RSE system 1 to reproduce the content data using an input device not shown, the camera 2 shoots the rear seat side and supplies the shot image data to the image recognizing unit 3. The image recognizing unit 3 executes image recognition of the shot image data received from the camera 2, calculates the coordinate position of the identification mark 9 provided on the headphones 8 in the shot image, and supplies the result to the connection deciding unit 4.

The connection deciding unit 4 decides on whether the coordinate position of the identification mark 9 received from the image recognizing unit 3 is in the image area corresponding to the left rear seat seen from the camera 2 or in the image area corresponding to the right rear seat seen from the camera 2 in the rear seat side shot image taken from the fixed point with the camera 2 (step ST1).

When the identification mark 9 is in the image area corresponding to the left rear seat (step ST1: left side seen from the camera 2), the connection deciding unit 4 makes a decision as shown in FIG. 3(b) that the passenger wearing the headphones 8 sits on the rear seat facing the right seat display 7b and wants to view the contents reproduced by the right seat display 7b, and instructs the audio communication unit 5 to connect the headphones 8 to the audio channel for the right seat display 7b. According to the instruction from the connection deciding unit 4, the audio communication unit 5 connects the audio channel for the right seat display 7b to the headphones 8 (step ST2-1). Thus, the audio signal of the audio channel for the right seat display 7b reproduced by the rear seat AV reproducing unit 6 is transmitted to the headphones 8 by wireless communications via the audio communication unit 5.

On the other hand, when the identification mark 9 is in the image area corresponding to the right rear seat (step ST1: the right seen from the camera 2), the connection deciding unit 4 makes a decision as shown in FIG. 3(a) that the passenger wearing the headphones 8 sits on the rear seat facing the left seat display 7a and wants to view the contents reproduced by the left seat display 7a, and instructs the audio communication unit 5 to connect the headphones 8 to the audio channel for the left seat display 7a.

According to the instruction from the connection deciding unit 4, the audio communication unit 5 connects the audio channel for the left seat display 7a to the headphones 8 (step ST2-2). Thus, the audio signal of the audio channel for the left seat display 7a reproduced by the rear seat AV reproducing unit 6 is transmitted to the headphones 8 by wireless communications via the audio communication unit 5.

As described above, according to the present embodiment 1, it executes image recognition of the identification mark 9 provided on the headphones 8 in the rear seat side shot image taken with the camera 2 to calculate the coordinate position of the identification mark 9 in the shot image, makes a decision from the coordinate position of the identification mark 9 as to which one of the plurality of rear seats the passenger wearing the audio output device sits on, and transmits to the headphones 8 the passenger wears the audio data corresponding to the video data to be displayed on the display screen facing the rear seat as to which a decision is made that the passenger sits on, thereby causing the headphones 8 to output the audio data.

This makes it possible to identify the device corresponding to each reproduction series automatically without using a dedicated device as the headphones 8 and without impairing the versatility of the device.

In particular, since it can obviate the necessity of a manual switching operation for selecting the audio channel on the headphones 8, it can simplify the hardware construction of the headphones 8.

Incidentally, although the foregoing embodiment 1 shows a configuration that provides the identification mark 9 on the headphones 8 for identifying the connection destination of the audio channel, the present invention is applicable not only to the headphones but also to other devices used for viewing contents.

For example, it is applicable to 3D glasses. As for recent 3D glasses, those have been developed which receive a correcting signal from a reproduction series side, and alter the refraction or shading of light in response to the correcting signal. The 3D glasses that carry out such adjustment can improve the appearance of the video which is displayed and viewed through the glasses.

To achieve this, the 3D glasses are provided with an identification mark, and the RSE system 1 automatically decides as to which one of the left and right displays a passenger wearing the 3D glasses watches.

In this case, the image recognizing unit 3 recognizes an image shot with the camera 2, and calculates the coordinate position of the identification mark 9 provided on the 3D glasses, and the connection deciding unit 4 automatically decides as to which one of the left and right displays the passenger watches. Receiving the decision result, the audio communication unit 5 transmits to the 3D glasses the correcting signal corresponding to the display the passenger watches. In response to the correcting signal, the 3D glasses alter a refraction, shading or transmitted state of light so as to optimize the appearance of the 3D video reproduced by the display.

Embodiment 2

The embodiment 2 has a plurality of identification marks provided on headphones, decides the direction of the face of a passenger wearing headphones (direction of the display the passenger views), and connects the headphones to the audio channel for the display corresponding to the decision result.

Figure 4:
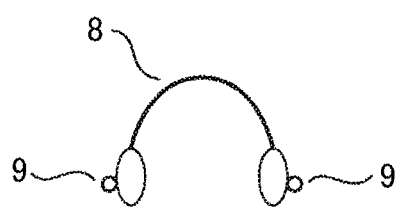
FIG. 4 is a diagram showing an example of headphones provided with a plurality of identification marks in the embodiment 2.

FIG. 4 is a diagram showing an example of headphones provided with a plurality of identification marks. In the example of FIG. 4, the headphones 8 has a plurality of (a pair of in FIG. 4) identification marks 9 provided on the two earphones at places on a plane perpendicular to the face direction of the passenger wearing the headphones 8.

Figure 5:
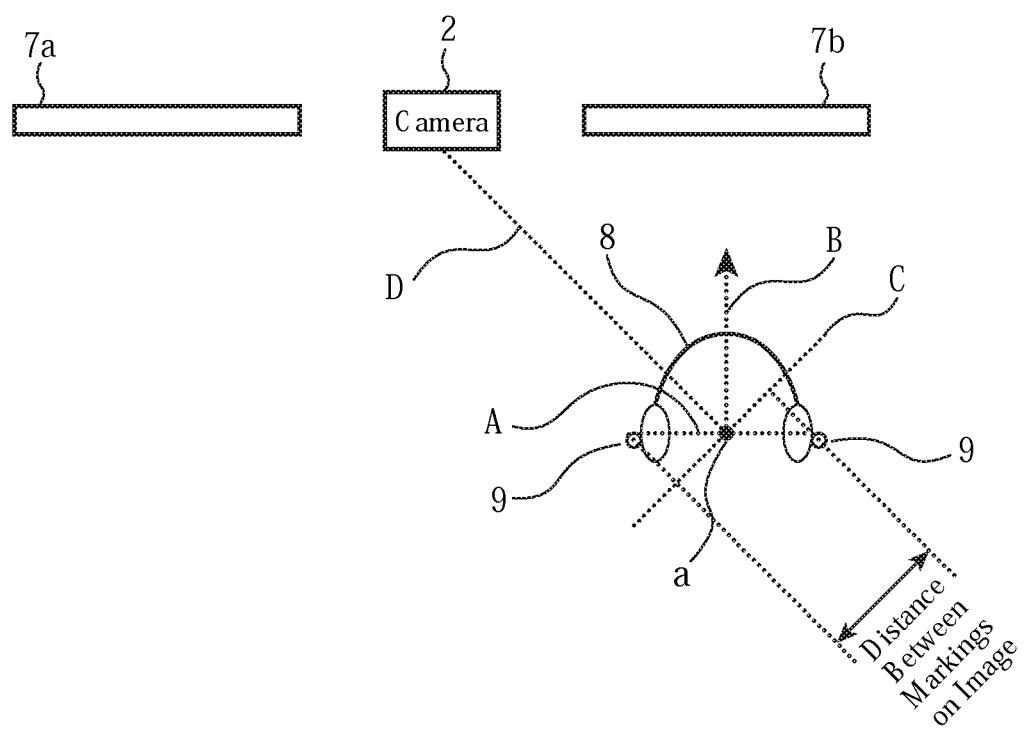
FIG. 5 is a diagram showing a case where a passenger sitting on a rear seat faces the opposite display.
Figure 6:
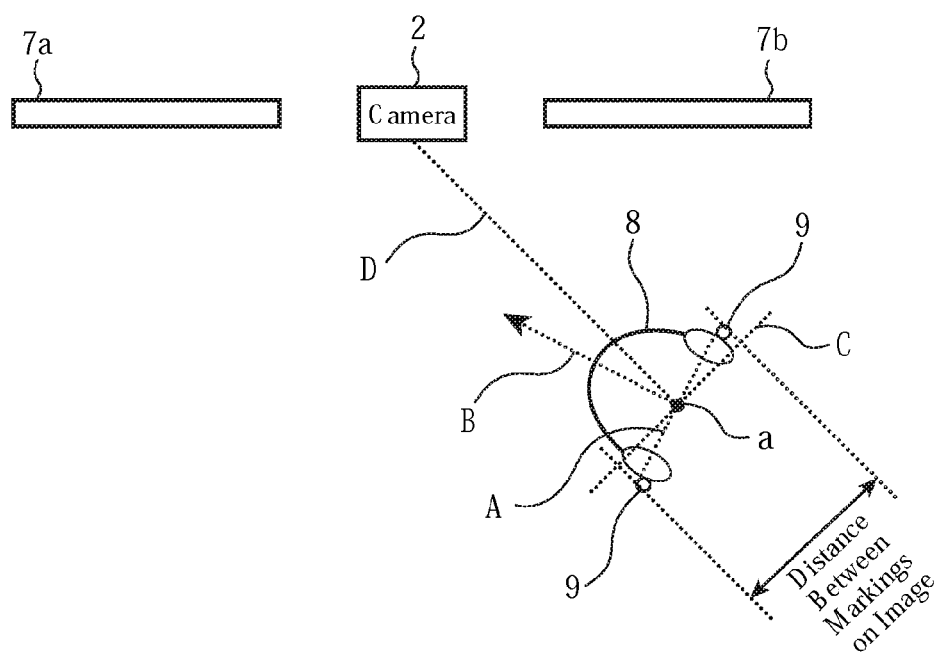
FIG. 6 is a diagram showing a case where a passenger sitting on the rear seat faces a display adjacent to the display the passenger faces in FIG. 5.

FIG. 5 is a diagram showing a case where the passenger sitting on a rear seat faces an opposite display, and FIG. 6 is a diagram showing a case where the passenger faces a display adjacent to the display which the passenger sitting on the rear seat faces in FIG. 5.

As in the foregoing embodiment 1, the present embodiment 2 also has a camera 2 at the intermediate position between the left seat display 7a and right seat display 7b to shoot the rear seat side. The shot image corresponds to a projection of a 3D subject on the rear seat side onto a two-dimensional plane (shooting plane) C perpendicular to the beam of light D interconnecting the shooting portion of the camera 2 with the midpoint a of the segment A across the two identification marks 9 as shown in FIG. 5 and FIG. 6.

Accordingly, when the headphones 8 have two identification marks 9 provided on the two earphones at the places on the plane A perpendicular to the face direction B of the passenger wearing the headphones 8, the distance between the two identification marks 9 in the image shot with the camera 2 alters in accordance with the face direction B of the passenger. For example, when the passenger faces the right seat display 7b facing the rear seat on which the passenger sits in the shot image, the distance between the two identification marks 9 becomes shorter as shown in FIG. 5, whereas when the passenger faces the left seat display 7a, the distance between the two identification marks 9 becomes longer as shown in FIG. 6.

The embodiment 2 utilizes such a principle to detect not only the position of the headphones 8, but also the direction B in which the passenger wearing the headphones 8 faces, that is, the display which the passenger views.

Figure 7:
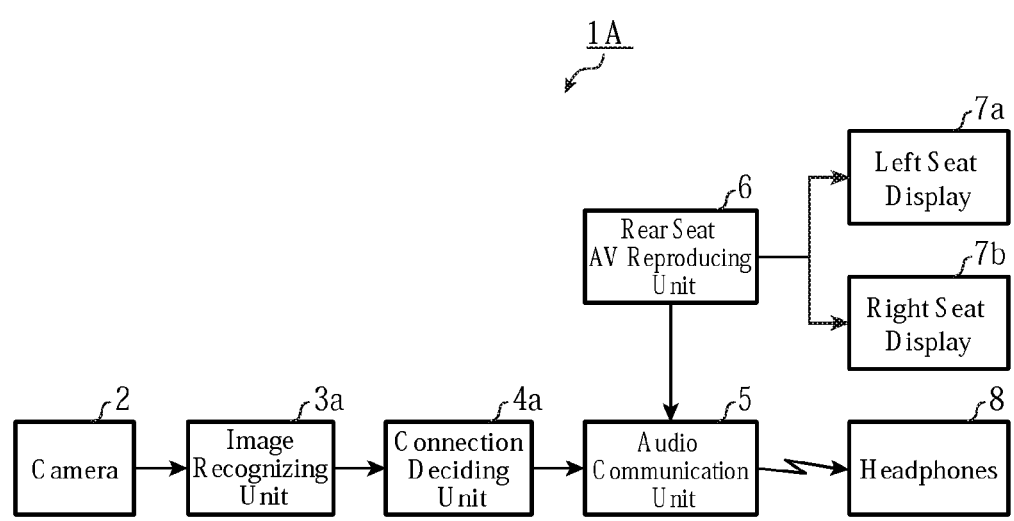
FIG. 7 is a block diagram showing a configuration of an AV system of an embodiment 2 in accordance with the present invention.

FIG. 7 is a block diagram showing a configuration of the AV system of the embodiment 2 in accordance with the present invention. In the RSE system 1A in FIG. 7, the image recognizing unit 3a executes image recognition of the shot image of the two identification marks 9 provided on the headphones 8 and calculates the distance between the identification marks 9 in the shot image; and according to the distance between the identification marks 9 calculated by the image recognizing unit 3a, the connection deciding unit (deciding unit) 4a decides as to which one of the audio channels for the displays 7a and 7b is to be connected to the headphones 8. The other components are the same as those of FIG. 1.

Next, the operation will be described.

Figure 8:
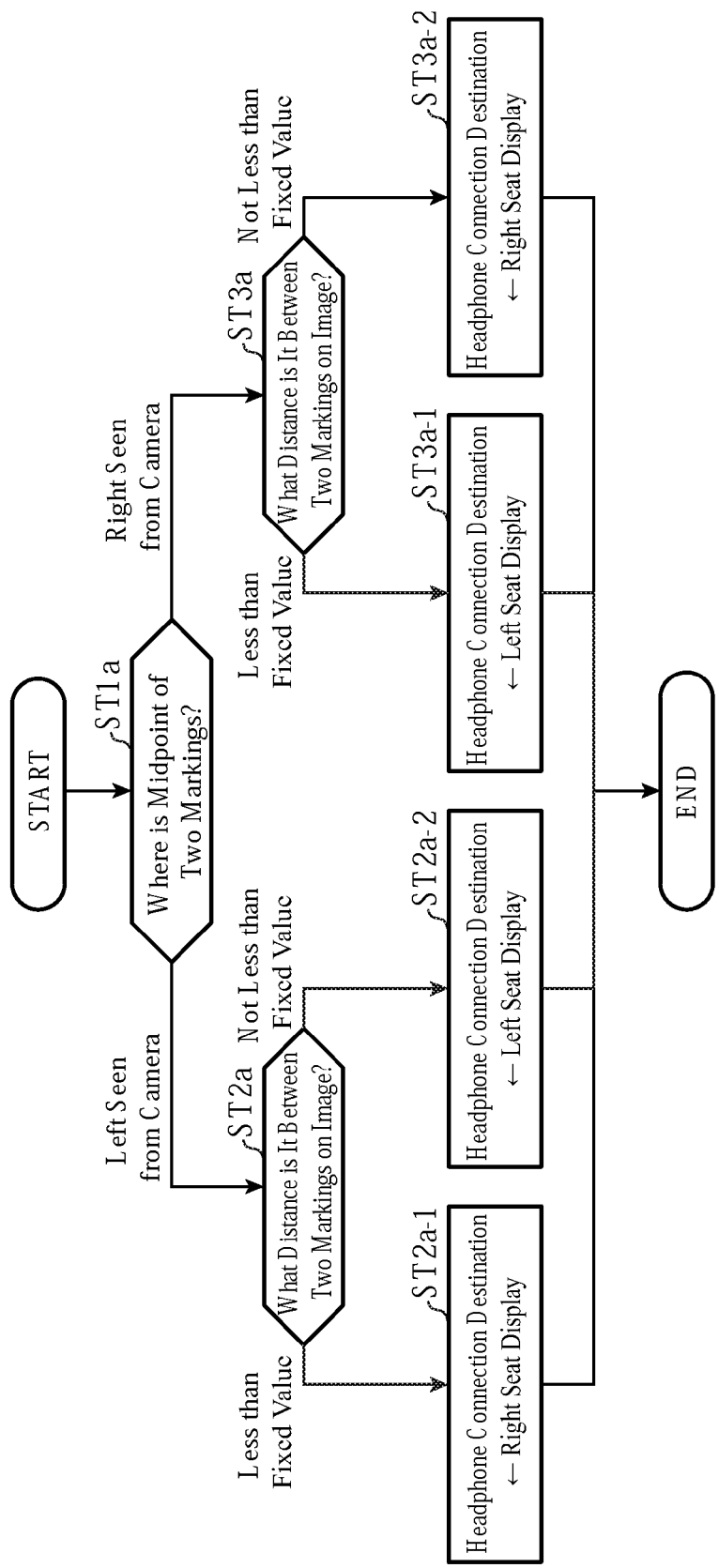
FIG. 8 is a flowchart showing a flow of the operation of the AV system of the embodiment 2.

FIG. 8 is a flowchart showing a flow of the operation of the AV system of the embodiment 2, which shows details of the processing of deciding as to which one of the audio channels for the displays is to be connected to the headphones 8. Referring to FIG. 5 and FIG. 6, details of the processing will be described along the line of FIG. 8.

When the passenger wearing the headphones 8 sits on the rear seat facing the left seat display 7a or right seat display 7b and instructs the RSE system 1A to reproduce the content data using an input device not shown, the camera 2 shoots the rear seat side and supplies the shot image data to the image recognizing unit 3a. The image recognizing unit 3a executes image recognition of the shot image data received from the camera 2, calculates the coordinate positions of the two identification marks 9 provided on the headphones 8 in the shot image, calculates from the coordinate positions the coordinate position of the midpoint a of the segment A connecting the two identification marks 9 in the shot image and the distance between the two identification marks 9, and supplies them to the connection deciding unit 4a.

The connection deciding unit 4a decides on whether the coordinate position of the midpoint a of the segment A interconnecting the identification marks 9 received from the image recognizing unit 3a is in the image area corresponding to the left rear seat seen from the camera 2 or in the image area corresponding to the right rear seat seen from the camera 2 in the rear seat side shot image taken from the fixed point with the camera 2 (step ST1a).

When the midpoint a of the segment A is in the image area corresponding to the left rear seat (step ST1a: left side seen from the camera 2), the connection deciding unit 4a makes a decision as shown in FIG. 5 and FIG. 6 that the passenger wearing the headphones 8 sits on the rear seat facing the right seat display 7b, and compares the distance between the two identification marks 9 in the shot image with a preset fixed value (step ST2a).

As for the foregoing fixed value, for example, a value corresponding to the distance between the two identification marks 9 on the headphones 8 worn by the passenger who sits on the rear seat is experimentally obtained in advance when the passenger faces in the direction of the display facing the rear seat and a value corresponding to the distance when the passenger faces in the direction of the display adjacent to the foregoing display. As for the value corresponding to the threshold, it can be a value within a prescribed range the distance between the two identification marks 9 can take.

In addition, as for the comparison of the distance between the two identification marks 9 in the shot image with the preset fixed value, considering the time for the passenger to decide as to which one of the contents reproduced by the left and right displays the passenger will view, the decision is made as to which one of the displays 7a and 7b the passenger faces when the state in which the distance is less than the foregoing fixed value or is not less than the fixed value continues for a prescribed time period.

When the distance between the two identification marks 9 in the shot image is less than the fixed value, the connection deciding unit 4a decides as shown in FIG. 5 that the passenger sitting on the rear seat has the face direction B looking toward the right seat display 7b and wants to view the contents reproduced by the right seat display 7b, and instructs the audio communication unit 5 to connect the headphones 8 to the audio channel for the right seat display 7b. According to the instruction from the connection deciding unit 4a, the audio communication unit 5 connects the audio channel for the right seat display 7b to the headphones 8 (step ST2a-1).

This causes the audio signal of the audio channel for the right seat display 7b reproduced by the rear seat AV reproducing unit 6 to be transmitted to the headphones 8 by wireless communications via the audio communication unit 5.

In contrast, when the distance between the two identification marks 9 in the shot image is not less than the fixed value, the connection deciding unit 4a decides as shown in FIG. 6 that the passenger sitting on the rear seat has the face direction B looking toward the left seat display 7a and wants to view the contents reproduced by the left seat display 7a, and instructs the audio communication unit 5 to connect the headphones 8 to the audio channel for the left seat display 7a. According to the instruction from the connection deciding unit 4a, the audio communication unit 5 connects the audio channel for the left seat display 7a to the headphones 8 (step ST2a-2). This causes the audio signal of the audio channel for the left seat display 7a reproduced by the rear seat AV reproducing unit 6 to be transmitted to the headphones 8 by wireless communications via the audio communication unit 5.

On the other hand, when the midpoint a of the segment A is in the image area corresponding to the right rear seat (step ST1a: the right seen from the camera 2), the connection deciding unit 4a makes a decision that the passenger wearing the headphones 8 sits on the rear seat facing the left seat display 7a and compares the distance between the two identification marks 9 in the shot image with the preset fixed value (step ST3a).

When the distance between the two identification marks 9 in the shot image is less than the fixed value, the connection deciding unit 4a decides as in the foregoing explanation that the passenger wants to view the contents reproduced on left seat display 7a, and instructs the audio communication unit 5 to connect the headphones 8 to the audio channel for the left seat display 7a. According to the instruction from the connection deciding unit 4a, the audio communication unit 5 connects the audio channel for the left seat display 7a to the headphones 8 (step ST3a-1). This causes the audio signal of the audio channel for the left seat display 7a reproduced by the rear seat AV reproducing unit 6 to be transmitted to the headphones 8 by wireless communications via the audio communication unit 5.

In addition, when the distance between the two identification marks 9 in the shot image is not less than the fixed value, the connection deciding unit 4a decides that the passenger wants to view the contents reproduced on the right seat display 7b, and instructs the audio communication unit 5 to connect the headphones 8 to the audio channel for the right seat display 7b. According to the instruction from the connection deciding unit 4a, the audio communication unit 5 connects the audio channel for the right seat display 7b to the headphones 8 (step ST3a-2). This causes the audio signal of the audio channel for the right seat display 7b reproduced by the rear seat AV reproducing unit 6 to be transmitted to the headphones 8 by wireless communications via the audio communication unit 5.

While the RSE system 1A is offering RSE, it can continuously execute the shooting of the rear seat side with the camera 2, image recognition by the image recognizing unit 3a and connection decision by the connection deciding unit 4a. In this case, for example, even if it decides that the passenger faces the left seat display 7a at first, when the state, in which the comparison result of the distance between the identification marks 9 with the fixed value is inverted, continues for the prescribed time period, it decides that the passenger faces the right seat display 7b at this time, and switches the audio channel.

As described above, according to the present embodiment 2, the headphones 8 have a plurality of identification marks 9 provided at the places on the plane perpendicular to the face direction of the passenger; the image recognizing unit 3a executes image recognition of the plurality of identification marks 9 provided on the headphones 8 in the shot image taken with the camera 2, and calculates the coordinate positions of the plurality of identification marks 9 and the distance between the plurality of identification marks 9 in the shot image; the connection deciding unit 4a decides as to which one of the plurality of rear seats the passenger wearing the headphones 8 sits on from the coordinate positions of the identification marks 9 calculated by the image recognizing unit 3a, and decides from the comparison result of the distance between the plurality of identification marks 9 with the prescribed threshold as to which display screen of the displays 7a and 7b the passenger who sits on the rear seat decided faces; and the audio communication unit 5 transmits to the headphones 8 the passenger wears the audio data which belongs to the audio data reproduced by the rear seat AV reproducing unit and corresponds to the video data displayed on the display screen as to which a decision is made that the passenger views by the connection deciding unit 4a, thereby producing as an audio output. This makes it possible to decide as to which one of the left and right displays 7a and 7b the passenger watches including the case where the passenger views the right seat display 7b from the left seat side or the left seat display 7a from the right seat side.

Incidentally, although the foregoing embodiment 2 shows the case where a single set of headphones 8 is provided with two identification marks 9, the single set of headphones 8 can be provided with three or more identification marks 9. In the case where a single set of headphones 8 is provided with three or more identification marks 9, the AV system can decide the direction of the face of the passenger more accurately.

Embodiment 3

The embodiment 3 has headphones provided with a plurality of identification marks as in the foregoing embodiment 2, and a plurality of cameras for shooting a rear seat; decides the direction of the face of the passenger wearing the headphones (the direction of the display the passenger views) using the recognition result of the identification marks in an image shot with the cameras; and connects the headphones to the audio channel for the display corresponding to the decision result.

Figure 9:
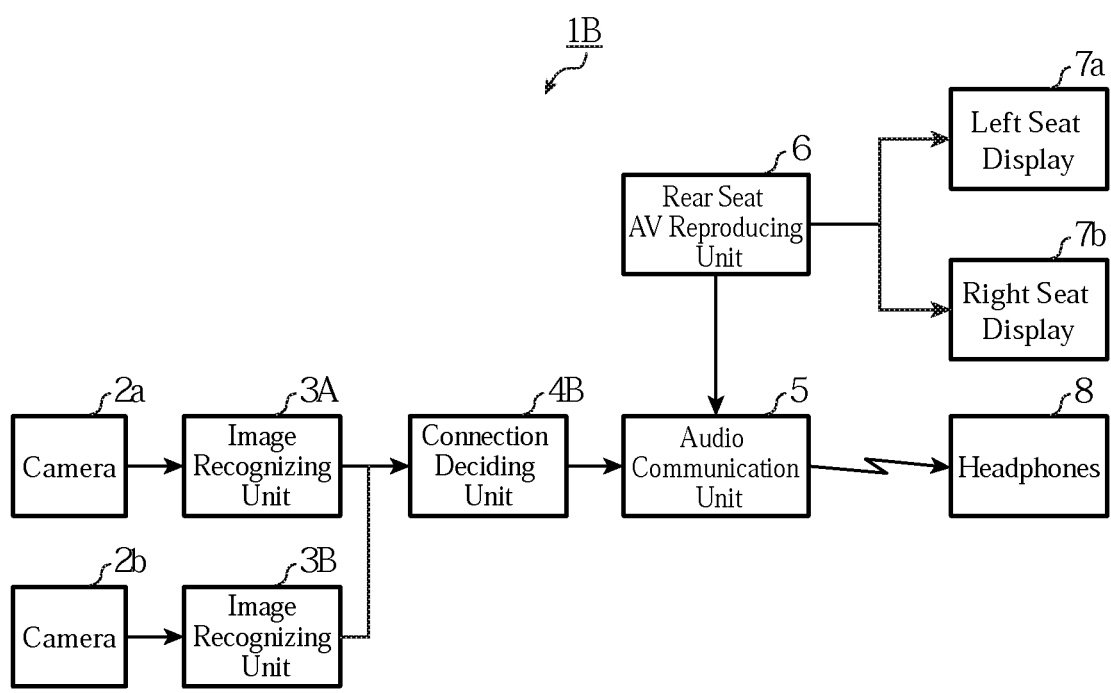
FIG. 9 is a block diagram showing a configuration of an AV system of an embodiment 3 in accordance with the present invention.

FIG. 9 is a block diagram showing a configuration of the AV system of the embodiment 3 in accordance with the present invention. As the foregoing embodiment 1 or 2, the RSE system 1B in FIG. 9 reproduces videos on the left seat display 7a and right seat display 7b, and supplies the headphones 8 corresponding to one of the displays 7a and 7b with the audio corresponding to the display contents of the display. In addition, as described in the foregoing embodiment 2 with reference to FIG. 4, the headphones 8 have two identification marks 9 provided on the two earphones of the headphones 8 at places on a plane perpendicular to the face direction of the passenger wearing the headphones 8.

The RSE system 1B comprises a camera 2a mounted on the left seat display 7a side, a camera 2b mounted on the right seat display 7b side, image recognizing units 3A and 3B, a connection deciding unit (deciding unit) 4B, the audio communication unit 5 and the rear seat AV reproducing unit 6. The image recognizing unit 3A executes image recognition of an image shot with the camera 2a and the image recognizing unit 3B executes image recognition of an image shot with the camera 2b. In addition, the connection deciding unit 4B decides as to which one of the audio channels is to be connected to the headphones 8 using the recognition results of the image recognizing units 3A and 3B.

Figure 10:
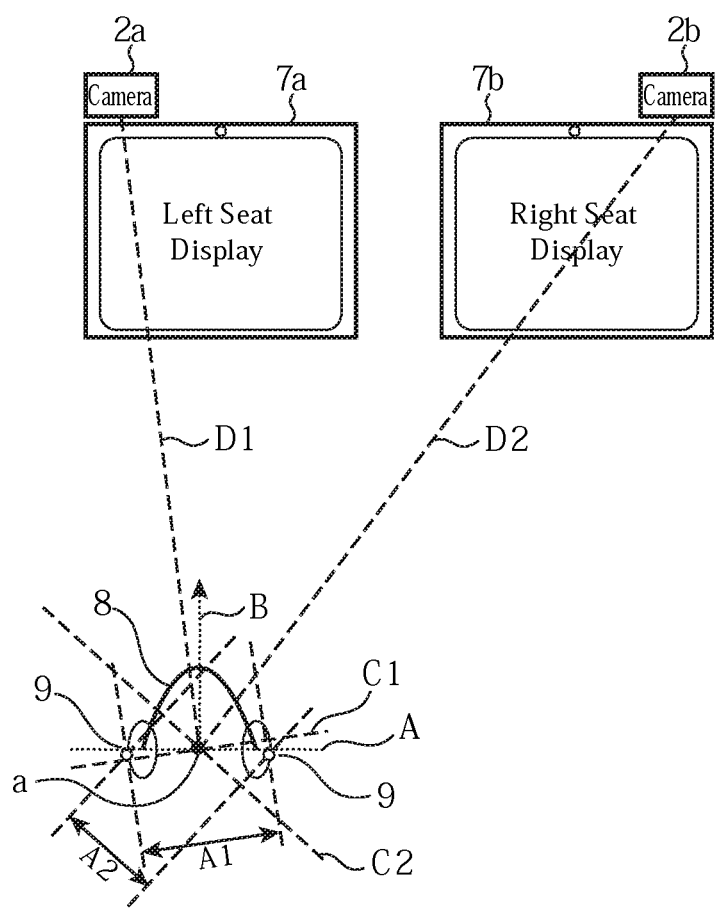
FIG. 10 is a diagram showing a case where a passenger sitting on a rear seat faces the opposite display.
Figure 11:
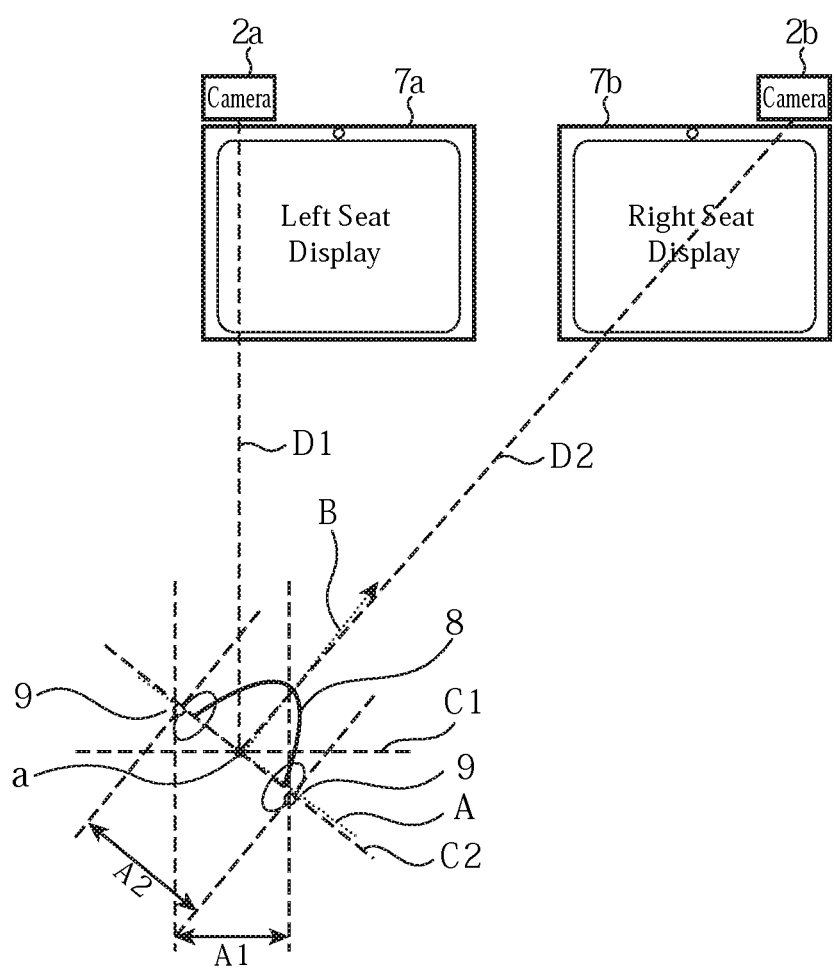
FIG. 11 is a diagram showing a case where a passenger sitting on the rear seat faces a display adjacent to the display the passenger faces in FIG. 10.

FIG. 10 is a diagram showing a case where the passenger sitting on a rear seat faces the opposite display, and FIG. 11 is a diagram showing a case where the passenger sitting on a rear seat faces the display adjacent to the display the passenger faces in FIG. 10. In the example shown in FIG. 10 and FIG. 11, the camera 2a is placed at the left end on top of the corresponding left seat display 7a seen from the rear seat side, and the camera 2b is placed at the right end on top of the corresponding right seat display 7b seen from the rear seat side. Incidentally, a display integrated with a camera can be employed as the displays 7a and 7b. In this case, a wiring system of the RSE system 1B can be simplified.

As shown in FIG. 10 and FIG. 11, shot images of the cameras 2a and 2b correspond to a projection of a 3D subject on the rear seat side onto a two-dimensional plane (shooting plane) C1 perpendicular to the beam of light D1 interconnecting the shooting portion of the camera 2a with the midpoint a of the segment A across the two identification marks 9 and onto a two-dimensional plane (shooting plane) C2 perpendicular to the beam of light D2 interconnecting the shooting portion of the camera 2b with the midpoint a of the segment A across the two identification marks 9.

Accordingly, when the headphones 8 have two identification marks 9 provided on the two earphones of the headphones 8 at places on the plane A perpendicular to the face direction B of the passenger wearing the headphones 8, the distances A1 and A2 between the two identification marks 9 in the images shot with the cameras 2a and 2b alter in accordance with the face direction B of the passenger.

For example, in images shot at the position of the camera 2a in FIG. 10 and FIG. 11, comparing a case where the face of the passenger is directed to the left seat display 7a facing the rear seat on which the passenger sits with a case where the face of the passenger is directed to the right seat display 7b, the distance A1 of the former is greater than the distance A1 of the latter as shown in FIG. 10 and FIG. 11.

In addition, in images shot at the position of the camera 2b, comparing a case where the face of the passenger is directed to the left seat display 7a facing the rear seat on which the passenger sits with a case where the face of the passenger is directed to the right seat display 7b, the distance A2 of the former is less than the distance A2 of the latter as shown in FIG. 10 and FIG. 11.

The embodiment 3 utilizes such a principle to detect not only the position of the headphones 8, but also the direction B in which the passenger wearing the headphones 8 faces, that is, the display which the passenger views.

Next, the operation will be described.

Referring to FIG. 10 and FIG. 11, details of the processing of deciding as to which one of the audio channels for the displays is to be connected to the headphones 8 will be described.

When the passenger wearing the headphones 8 sits on the rear seat facing the left seat display 7a or right seat display 7b and instructs the RSE system 1B to reproduce the content data using an input device not shown, the cameras 2a and 2b shoot the rear seat side and supply the shot image data to the image recognizing units 3A and 3B, respectively.

The image recognizing unit 3A executes image recognition of the shot image data received from the camera 2a, calculates in the shot image the coordinate positions of the two identification marks 9 provided to the headphones 8, calculates from the coordinate positions the coordinate position of the midpoint a of the segment A interconnecting the two identification marks 9 and the distance A1 between the two identification marks 9 in the shot image, and supplies them to the connection deciding unit 4B.

Likewise, the image recognizing unit 3B executes image recognition of the shot image data received from the camera 2b, calculates in the shot image the coordinate positions of the two identification marks 9 provided to the headphones 8, calculates from the coordinate positions the coordinate position of the midpoint a of the segment A interconnecting the two identification marks 9 and the distance A2 between the two identification marks 9 in the shot image, and supplies them to the connection deciding unit 4B.

The connection deciding unit 4B decides on whether the coordinate position of the midpoint a of the segment A interconnecting the identification marks 9 received from the image recognizing unit 3A is in the image area corresponding to the left rear seat seen from the camera 2a or in the image area corresponding to the right rear seat seen from the camera 2a in the rear seat side shot image taken from the fixed point with the camera 2a.

Likewise, the connection deciding unit 4B decides on whether the coordinate position of the midpoint a of the segment A interconnecting the identification marks 9 received from the image recognizing unit 3B is in the image area corresponding to the left rear seat seen from the camera 2b or in the image area corresponding to the right rear seat seen from the camera 2b in the rear seat side shot image taken from the fixed point with the camera 2b.

Here, unless the connection deciding unit 4B obtains the same result as to the decision using the image recognition result by the image recognizing unit 3A and the decision using the image recognition result by the image recognizing unit 3B, it repeats the foregoing processing using the result of shooting the rear seat side, again.

When both the foregoing decision results show that the midpoint a of the segment A is in the image area corresponding to the left rear seat, the connection deciding unit 4B decides that the passenger wearing the headphones 8 sits on the rear seat facing the right seat display 7b, compares the distance A1 between the two identification marks 9 in the shot image the image recognizing unit 3A calculates with a fixed value Th1 and compares the distance A2 between the two identification marks 9 in the shot image the image recognizing unit 3B calculates with a fixed value Th2.

Here, as for the comparison of the distances A1 and A2 between the two identification marks 9 in the shot image with the fixed values Th1 and Th2, considering the time for the passenger to decide as to which one of the contents, that is, which one of the contents reproduced by the left and right displays the passenger will view, the decision is made as to which one of the displays 7a and 7b the passenger faces when the same comparison result continues for a prescribed time period.

When the connection deciding unit 4B decides from the comparison results of both the distances A1 and A2 that the passenger sitting on the rear seat has the face direction B looking toward the right seat display 7b and wants to view the contents reproduced by the right seat display 7b, it instructs the audio communication unit 5 to connect the headphones 8 to the audio channel for the right seat display 7b.

According to the instruction from the connection deciding unit 4B, the audio communication unit 5 connects the audio channel for the right seat display 7b to the headphones 8. This causes the audio signal of the audio channel for the right seat display 7b reproduced by the rear seat AV reproducing unit 6 to be transmitted to the headphones 8 by wireless communications via the audio communication unit 5.

Likewise, when the connection deciding unit 4B decides from the comparison results of both the distances A1 and A2 that the passenger sitting on the rear seat has the face direction B looking toward the left seat display 7a and wants to view the contents reproduced by the left seat display 7a, it instructs the audio communication unit 5 to connect the headphones 8 to the audio channel for the left seat display 7a so that the audio signal of the audio channel for the left seat display 7a reproduced by the rear seat AV reproducing unit 6 is transmitted to the headphones 8 by wireless communications via the audio communication unit 5.

Furthermore, when the midpoint a of the segment A is in the image area corresponding to the right rear seat, the foregoing processing is applicable in the same manner.

Incidentally, although the foregoing description is made byway of example of deciding the connection destination of the audio channel when it is possible to decide from both the comparison results as to the distances A1 and A2 that the passenger sitting on the rear seat has the face direction B looking toward the right seat display 7b and wants to view the contents reproduced by the right seat display 7b, the connection destination of the audio channel can be decided by giving priority to the result of the rear seat side on which the passenger sits. For example, in the case FIG. 10 and FIG. 11, the priority is given to the decision made from the comparison result about the distance A1, which employs the shot image taken with the camera 2a mounted on the left seat display 7a facing the rear seat on which the passenger sits.

As described above, according to the present embodiment 3, it comprises a plurality of cameras 2a and 2b, wherein using the shot images taken with the camera unit 2a and 2b, the connection deciding unit 4B decides as to which one of the plurality of rear seats the passenger wearing the headphones 8 sits on from the coordinate positions of the plurality of identification marks 9 calculated by the image recognizing units 3A and 3B, and decides as to which one of the display screens of the displays 7a and 7b the passenger faces from the comparison results of the distances between the plurality of identification marks 9 in the shot images taken with the cameras 2a and 2b with the prescribed thresholds. This makes it possible to improve the decision accuracy as to the position of the headphones 8 and the viewing direction of the passenger.

In addition, according to the foregoing embodiment 3, since it has the cameras 2a and 2b mounted on the displays 7a and 7b, respectively, it can simplify a wiring system of the hardware of the system. Incidentally, integrating the display and camera into one body offers an advantage of being able to further simplify the wiring system of the hardware of the system.

Embodiment 4

In the embodiment 4, a configuration will be described which provides two headphones with different identification marks, and decides from the coordinate positions of the identification marks as to which one of the left and right rear seats each passenger wearing the headphones sits on, and which one of the audio channels for the left and right displays is to be connected to the headphones.

Figure 12:
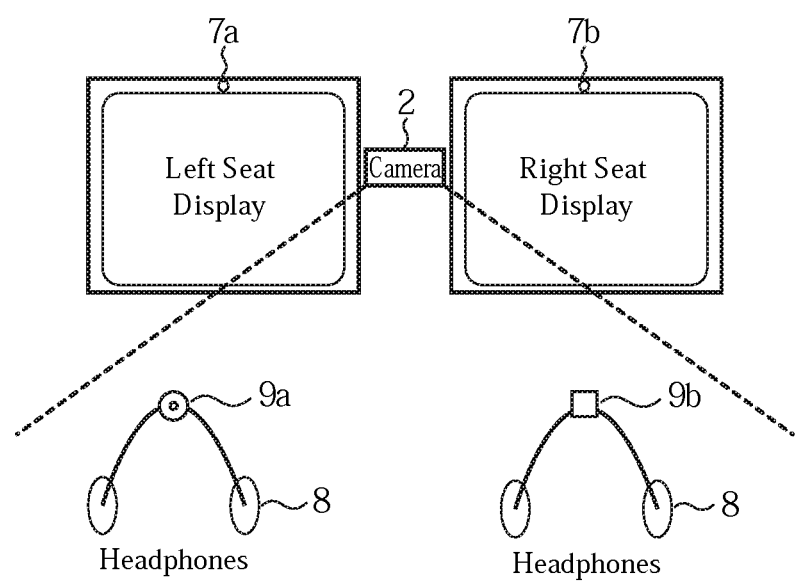
FIG. 12 is a diagram showing an example of headphones provided with an identification mark in an embodiment 4.

FIG. 12 is a diagram showing an example of two headphones provided with different identification marks. In FIG. 12, the first headphones 8 are provided with an identification mark 9a and the second headphones 8 are provided with an identification mark 9b. In the embodiment 4, the identification marks 9a and 9b are obtained by applying different printings in colors or shapes to the two headphones 8. Incidentally, the identification marks 9a and 9b are not limited to the printing applied on the headphones 8, but LEDs can also be used as will be described later in the following embodiment 5 and embodiment 6.

Figure 13:
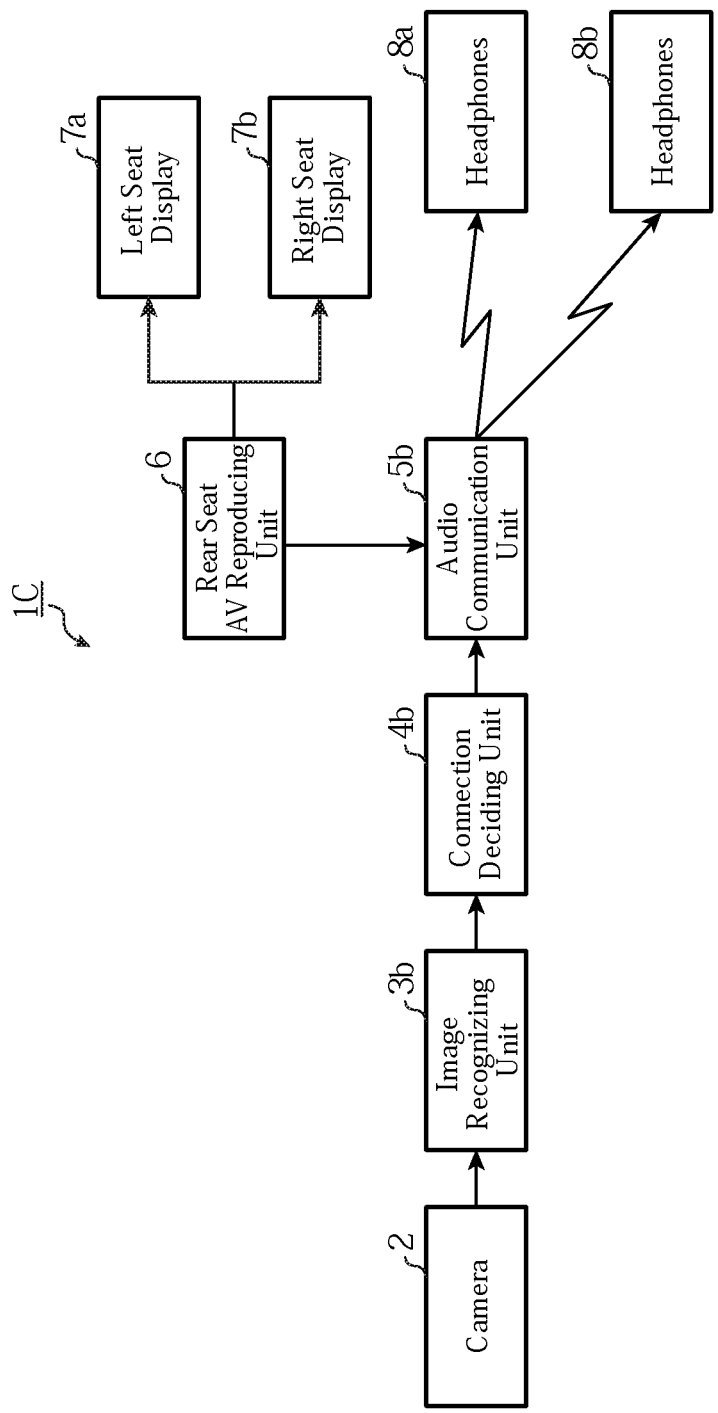
FIG. 13 is a block diagram showing a configuration of an AV system of the embodiment 4 in accordance with the present invention.

FIG. 13 is a block diagram showing a configuration of the AV system of the embodiment 4 in accordance with the present invention, which shows a case where the present invention is applied to an RSE system having two reproduction series capable of reproducing different videos and audios with displays mounted on right and left seats of a vehicle.

As shown in FIG. 13, the RSE system 1C reproduces videos with the left seat display 7a and right seat display 7b, and supplies the headphones (audio output device) 8a or 8b corresponding to the display 7a or 7b with an audio corresponding to the display contents of the display. It comprises as its components a camera 2, an image recognizing unit 3b, a connection deciding unit (deciding unit) 4b, an audio communication unit 5b and the rear seat AV reproducing unit 6.

The image recognizing unit 3b is a component for executing image recognition of shot image data acquired from the camera 2, and for calculating in the shot image the coordinate positions of the identification marks 9a and 9b provided on the headphones 8a and 8b. For example, the image recognizing unit 3b has image patterns of the identification marks 9a and 9b registered therein, and calculates the coordinate positions of the identification marks 9a and 9b in the shot image by matching the shot image with the image patterns. Incidentally, considering a movement of a passenger wearing the headphones such as moving to a new seat, it can calculate the coordinate positions of the identification marks from a real time result taken with the camera 2.

The connection deciding unit 4b is a component for deciding from the coordinate position of the identification mark 9a calculated by the image recognizing unit 3b as to which one of the left and right rear seats the passenger wearing the headphones 8a sits on, that is, which one of the audio channels for the displays 7a and 7b the passenger will connect to the headphones 8a, and for deciding from the coordinate position of the identification mark 9b calculated by the image recognizing unit 3b as to which one of the audio channels for the displays 7a and 7b the passenger wearing the headphones 8b provided with the identification mark 9b will connect to the headphones 8b.

The audio communication unit 5b is a component that has ID information (ID=1) unique to the headphones 8a and ID information (ID=2) unique to the headphones 8b registered therein as ID information for identifying the headphones to be connected via wireless communications, establishes a connection between the headphones 8a or 8b identified using the ID information and the audio channel corresponding to the decision result of the connection deciding unit 4b, and transmits the audio signal reproduced by the rear seat AV reproducing unit 6 to the headphones 8a or 8b by the wireless communications. The remaining components 2, 6, 7a and 7b are the same as their counterparts described in the foregoing embodiment 1 with reference to FIG. 1.

Next, the operation will be described.

Figure 14:
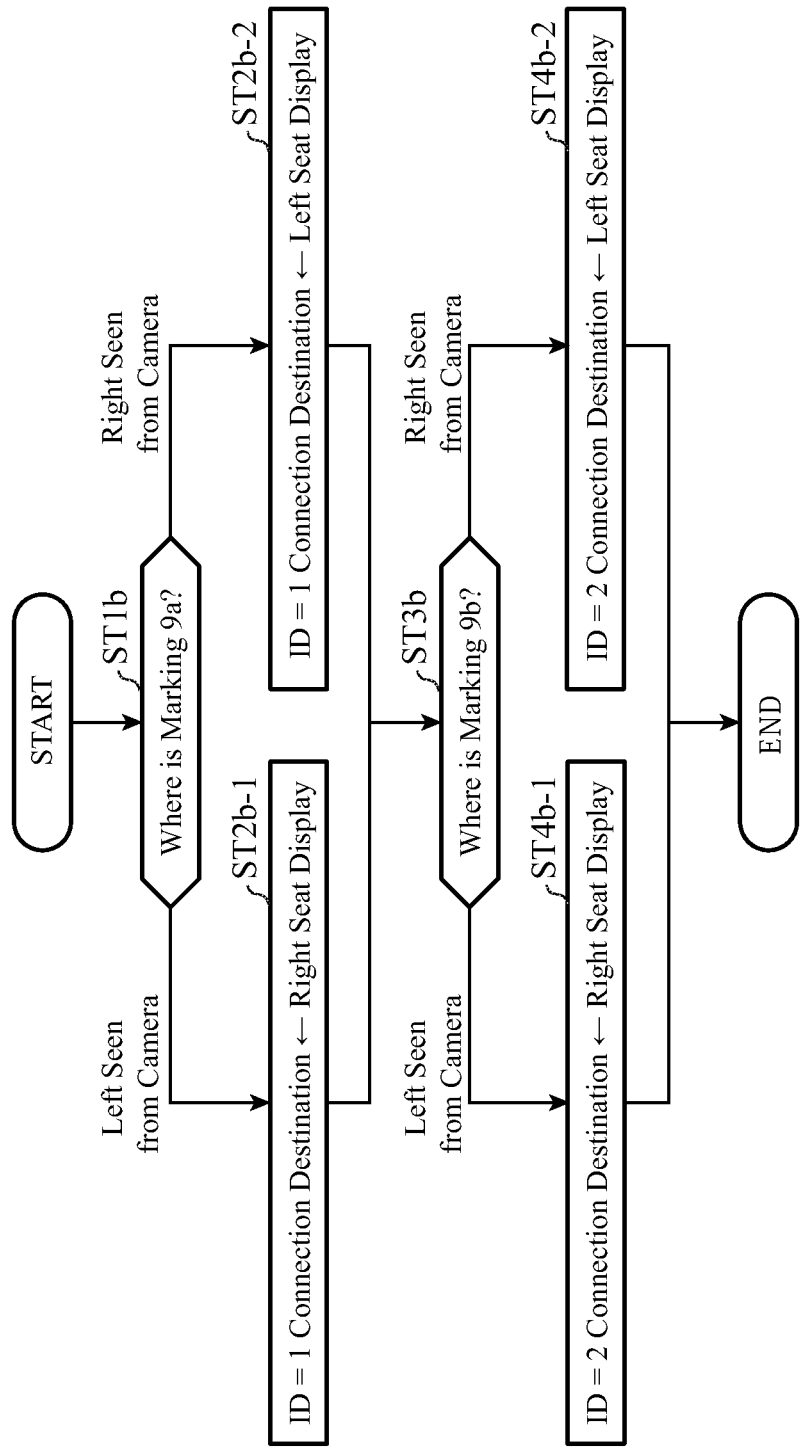
FIG. 14 is a flowchart showing a flow of the operation of the AV system of the embodiment 4.

FIG. 14 is a flowchart showing a flow of the operation of the AV system of the embodiment 4, which shows details of the processing of deciding as to which one of the audio channels for the displays is to be connected to the headphones 8a or 8b. Details of the processing will be described along the line of FIG. 14.

When the passenger wearing the headphones 8a or the passenger wearing the headphones 8b sits on the rear seat facing the left seat display 7a or right seat display 7b and instructs the RSE system 1C to reproduce the content data using an input device not shown, the camera 2 shoots the rear seat side and supplies the shot image data to the image recognizing unit 3b.

The image recognizing unit 3b executes image recognition of the shot image data received from the camera 2, calculates in the shot image the coordinate position of the identification mark 9a provided on the headphones 8a, and supplies the calculation result to the connection deciding unit 4b. The connection deciding unit 4b decides on whether the coordinate position of the identification mark 9a received from the image recognizing unit 3b is in the image area corresponding to the left rear seat seen from the camera 2 or in the image area corresponding to the right rear seat seen from the camera 2 in the rear seat side shot image taken from the fixed point with the camera 2 (step ST1b).

When the identification mark 9a is in the image area corresponding to the left rear seat (step ST1b: left side seen from the camera 2), the connection deciding unit 4b makes a decision that the passenger wearing the headphones 8a sits on the rear seat facing the right seat display 7b and wants to view the contents reproduced by the right seat display 7b, and instructs the audio communication unit 5b to connect the headphones 8a to the audio channel for the right seat display 7b.

When identifying the headphones 8a using the ID information (ID=1), the audio communication unit 5b connects the audio channel for the right seat display 7b to the headphones 8a in accordance with the instruction from the connection deciding unit 4b (step ST2b-1). Thus, the audio signal of the audio channel for the right seat display 7b reproduced by the rear seat AV reproducing unit 6 is transmitted to the headphones 8a by wireless communications via the audio communication unit 5b.

On the other hand, when the identification mark 9a is in the image area corresponding to the right rear seat (step ST1b: the right seen from the camera 2), the connection deciding unit 4b makes a decision that the passenger wearing the headphones 8a sits on the rear seat facing the left seat display 7a and wants to view the contents reproduced by the left seat display 7a, and instructs the audio communication unit 5b to connect the headphones 8a to the audio channel for the left seat display 7a.

When identifying the headphones 8a using the ID information (ID=1), the audio communication unit 5b connects the audio channel for the left seat display 7a to the headphones 8a in accordance with the instruction from the connection deciding unit 4b (step ST2b-2). Thus, the audio signal of the audio channel for the left seat display 7a reproduced by the rear seat AV reproducing unit 6 is transmitted to the headphones 8a by wireless communications via the audio communication unit 5b.

After that, the image recognizing unit 3b executes image recognition of the shot image data received from the camera 2, calculates the coordinate position of the identification mark 9b provided on the headphones 8b in the shot image, and supplies the calculation result to the connection deciding unit 4b. The connection deciding unit 4b decides on whether the coordinate position of the identification mark 9b received from the image recognizing unit 3b is in the image area corresponding to the left rear seat seen from the camera 2 or in the image area corresponding to the right rear seat seen from the camera 2 in the rear seat side shot image taken from the fixed point with the camera 2 (step ST3b).

When the identification mark 9b is in the image area corresponding to the left rear seat (step ST3b: left side seen from the camera 2), the connection deciding unit 4b makes a decision that the passenger wearing the headphones 8b sits on the rear seat facing the right seat display 7b and wants to view the contents reproduced by the right seat display 7b, and instructs the audio communication unit 5b to connect the headphones 8b to the audio channel for the right seat display 7b.

When identifying the headphones 8b using the ID information (ID=2), the audio communication unit 5b connects the audio channel for the right seat display 7b to the headphones 8b in accordance with the instruction from the connection deciding unit 4b (step ST4b-1). Thus, the audio signal of the audio channel for the right seat display 7b reproduced by the rear seat AV reproducing unit 6 is transmitted to the headphones 8b by wireless communications via the audio communication unit 5b.

On the other hand, when the identification mark 9b is in the image area corresponding to the right rear seat (step ST3b: the right seen from the camera 2), the connection deciding unit 4b makes a decision that the passenger wearing the headphones 8b sits on the rear seat facing the left seat display 7a and wants to view the contents reproduced by the left seat display 7a, and instructs the audio communication unit 5b to connect the headphones 8b to the audio channel for the left seat display 7a.

When identifying the headphones 8b using the ID information (ID=2), the audio communication unit 5b connects the audio channel for the left seat display 7a to the headphones 8b in accordance with the instruction from the connection deciding unit 4b (step ST4b-2). Thus, the audio signal of the audio channel for the left seat display 7a reproduced by the rear seat AV reproducing unit 6 is transmitted to the headphones 8b by wireless communications via the audio communication unit 5b.

As described above, according to the present embodiment 4, the headphones 8a and 8b are provided with different identification marks 9a and 9b, respectively, wherein the image recognizing unit 3b executes image recognition of the identification marks 9a and 9b in the shot image taken with the camera 2, and calculates in the shot image the coordinate positions of the different identification marks 9a and 9b; the connection deciding unit 4b decides from the coordinate positions of the identification marks 9a and 9b calculated by the image recognizing unit 3b as to which one of the plurality of rear seats is occupied by each of the plurality of passengers wearing the headphones 8a and 8b; and the audio communication unit 5b transmits to the headphones 8a or 8b the audio data which is selected from the audio data reproduced by the rear seat AV reproducing unit 6 and corresponds to the video data to be displayed on the display screen facing to each of the plurality of rear seats, which is decided by the connection deciding unit 4b that each of the plurality of passengers sits on, thereby causing the headphones to produce the output audio. This makes it possible for the passengers wearing the two headphones 8a and 8b to use the right and left reproduction series simultaneously.

Embodiment 5

The embodiment 5 has identification marks each composed of an LED and alters the blinking frequency of the LED for each headphones, thereby realizing the individual identification marks of the foregoing embodiment 4.

Figure 15:
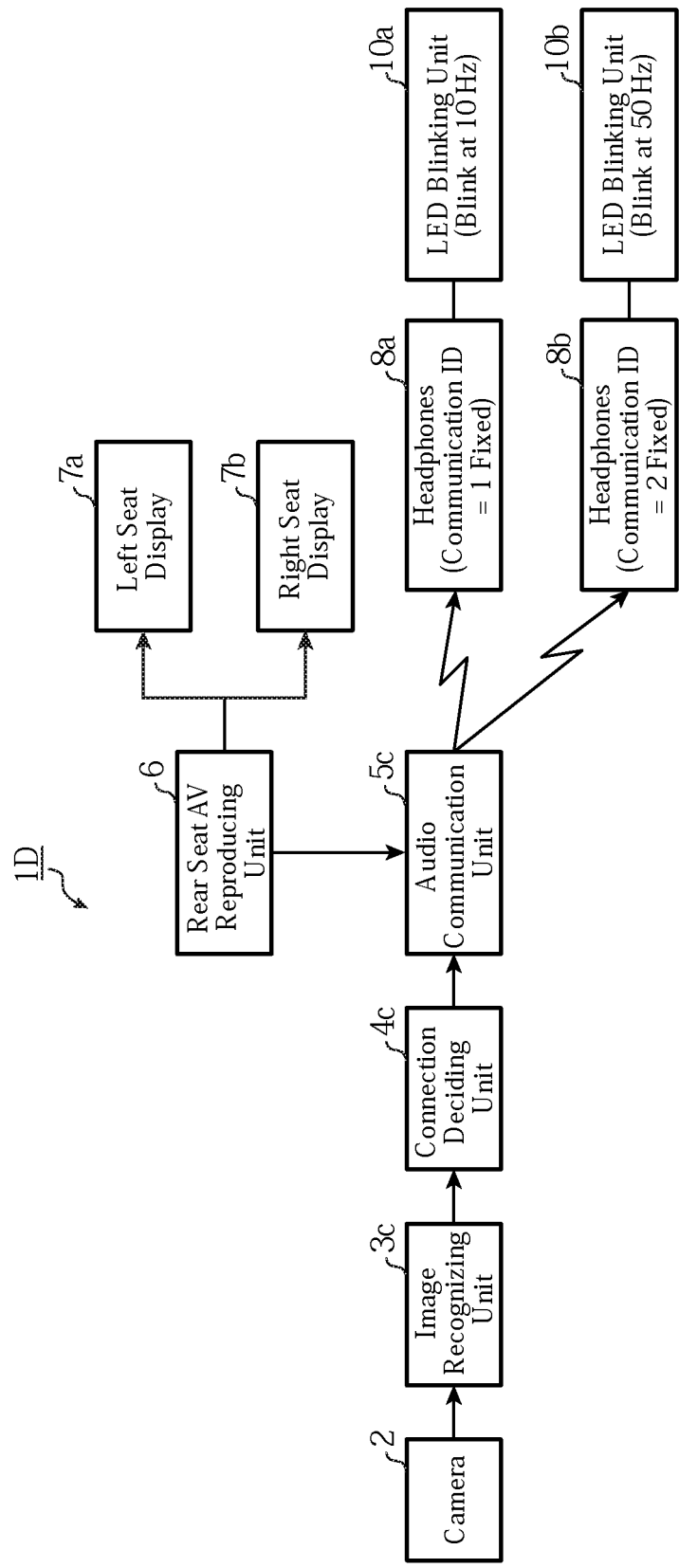
FIG. 15 is a block diagram showing a configuration of an AV system of an embodiment 5 in accordance with the present invention.

FIG. 15 is a block diagram showing a configuration of the AV system of the embodiment 5 in accordance with the present invention, which shows a case where the present invention is applied to an RSE system comprising two reproduction series capable of reproducing different videos and audios with displays mounted on right and left seats of a vehicle.

As shown in FIG. 15, in the RSE system 1D, the left seat display 7a and right seat display 7b reproduce videos, and the headphones 8a or 8b corresponding to one of the displays 7a and 7b are supplied with an audio correspond to the display contents of the display. It comprises a camera 2, an image recognizing unit 3c, a connection deciding unit 4c, an audio communication unit 5c and the rear seat AV reproducing unit 6 as its components.

The image recognizing unit 3c is a component for executing image recognition of shot image data acquired from the camera 2, and for calculating in the shot image the coordinate positions of the identification marks 9a and 9b provided on the headphones 8a and 8b. For example, the image recognizing unit 3c has image patterns registered therein, which correspond to the blinking frequencies of the LEDs and are used as the identification marks 9a and 9b, and calculates the coordinate positions of the identification marks 9a and 9b in the shot image by matching the shot image with the image patterns. Incidentally, considering a movement of a passenger wearing the headphones such as moving to a new seat, it can calculate the coordinate positions of the identification marks from a real time result taken with the camera 2.

The connection deciding unit (deciding unit) 4c is a component for deciding from the coordinate position of the identification mark 9a calculated by the image recognizing unit 3c as to which one of the left and right rear seats the passenger wearing the headphones 8a sits on, that is, which one of the audio channels for the displays 7a and 7b the passenger will connect to the headphones 8a, and for deciding from the coordinate position of the identification mark 9b calculated by the image recognizing unit 3c as to which one of the audio channels for the displays 7a and 7b the passenger wearing the headphones 8b provided with the identification mark 9b will connect to the headphones 8b.

The audio communication unit 5c is a component that has ID information (ID=1) unique to the headphones 8a and ID information (ID=2) unique to the headphones 8b registered therein as ID information for identifying the headphones to be connected via wireless communications, establishes a connection between the headphones 8a or 8b identified using the ID information and the audio channel corresponding to the decision result of the connection deciding unit 4b, and transmits the audio signal reproduced by the rear seat AV reproducing unit 6 to the headphones 8a or 8b by wireless communications.

LED blinking units 10a and 10b are components that are provided on the headphones 8a and 8b, respectively, and blink the LEDs serving as the identification marks 9a and 9b at different blinking frequencies. In the example of FIG. 15, the LED blinking unit 10a blinks the LED constituting the identification mark 9a at 10 Hz, and the LED blinking unit 10b blinks the LED constituting the identification mark 9b at 50 Hz. As for the other components 2, 6, 7a and 7b, they have the same constructions as their counterparts described in the foregoing embodiment 1 with reference to FIG. 1.

Next, the operation will be described.

Figure 16:
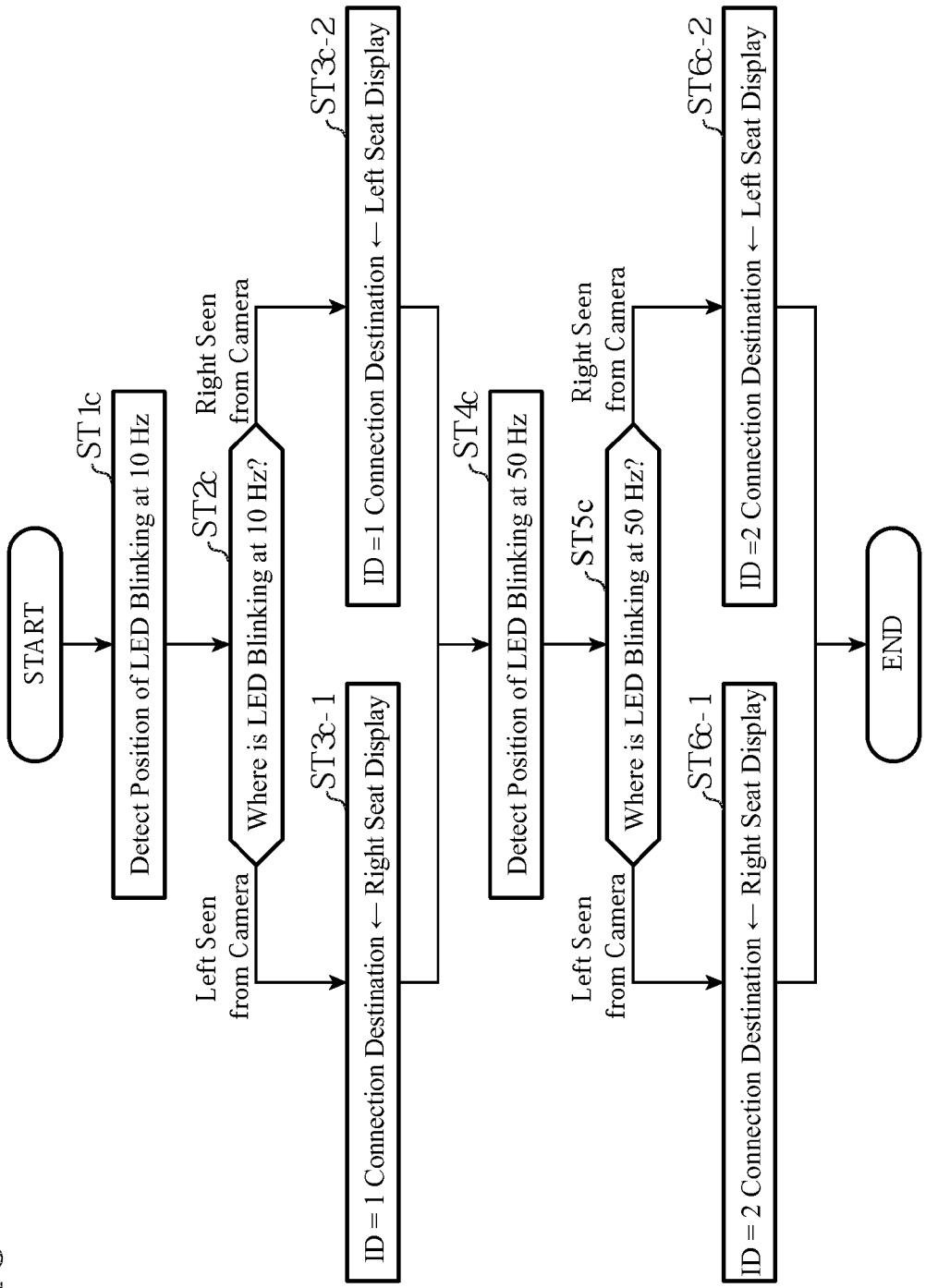
FIG. 16 is a flowchart showing a flow of the operation of the AV system of the embodiment 5.

FIG. 16 is a flowchart showing a flow of the operation of the AV system of the embodiment 5, which shows details of the processing of deciding as to which one of the audio channels for the displays is to be connected to the headphones 8a or 8b. Details of the processing will be described along the line of FIG. 16.

In response to a lighting instruction operation (switch operation, for example) of a passenger wearing the headphones 8a and a passenger wearing the headphones 8b, the LED blinking units 10a and 10b blink the LEDs provided on the headphones 8a and 8b at the blinking frequency of 10 Hz and at the blinking frequency of 50 Hz, respectively.

After that, when one the foregoing two passengers sits on the rear seat facing the left seat display 7a or right seat display 7b and instructs the RSE system 1D to reproduce the content data using an input device not shown, the camera 2 shoots the rear seat side and supplies the shot image data to the image recognizing unit 3c.

The image recognizing unit 3c executes image recognition of the shot image data received from the camera 2, calculates in the shot image the coordinate position of the LED blinking at 10 Hz, which constitutes the identification mark 9a provided on the headphones 8a, and supplies the calculation result to the connection deciding unit 4c (step ST1c). The connection deciding unit 4c decides on whether the coordinate position of the LED blinking at 10 Hz (identification mark 9a) received from the image recognizing unit 3c is in the image area corresponding to the left rear seat seen from the camera 2 or in the image area corresponding to the right rear seat seen from the camera 2 in the rear seat side shot image taken from the fixed point with the camera 2 (step ST2c).

When the LED blinking at 10 Hz is in the image area corresponding to the left rear seat (step ST2c: left side seen from the camera 2), the connection deciding unit 4c makes a decision that the passenger wearing the headphones 8a sits on the rear seat facing the right seat display 7b and wants to view the contents reproduced by the right seat display 7b, and instructs the audio communication unit 5c to connect the headphones 8a to the audio channel for the right seat display 7b.

When identifying the headphones 8a using the ID information (ID=1), the audio communication unit 5c connects the audio channel for the right seat display 7b to the headphones 8a in accordance with the instruction from the connection deciding unit 4c (step ST3c-1). Thus, the audio signal of the audio channel for the right seat display 7b reproduced by the rear seat AV reproducing unit 6 is transmitted to the headphones 8a by wireless communications via the audio communication unit 5c.

On the other hand, when the LED blinking at 10 Hz is in the image area corresponding to the right rear seat (step ST2c: right side seen from the camera 2), the connection deciding unit 4c makes a decision that the passenger wearing the headphones 8a sits on the rear seat facing the left seat display 7a and wants to view the contents reproduced by the left seat display 7a, and instructs the audio communication unit 5c to connect the headphones 8a to the audio channel for the left seat display 7a.

When identifying the headphones 8a using the ID information (ID=1), the audio communication unit 5c connects the audio channel for the left seat display 7a to the headphones 8a in accordance with the instruction from the connection deciding unit 4c (step ST3c-2). Thus, the audio signal of the audio channel for the left seat display 7a reproduced by the rear seat AV reproducing unit 6 is transmitted to the headphones 8a by wireless communications via the audio communication unit 5c.

After that, the image recognizing unit 3c executes image recognition of the shot image data received from the camera 2, calculates in the shot image the coordinate position of the LED blinking at 50 Hz, which constitutes the identification mark 9b provided on the headphones 8b, and supplies the calculation result to the connection deciding unit 4c (step ST4c). The connection deciding unit 4c decides on whether the coordinate position of the LED blinking at 50 Hz (identification mark 9b) received from the image recognizing unit 3c is in the image area corresponding to the left rear seat seen from the camera 2 or in the image area corresponding to the right rear seat seen from the camera 2 in the rear seat side shot image taken from the fixed point with the camera 2 (step ST5c).

When the LED blinking at 50 Hz is in the image area corresponding to the left rear seat (step ST5c: left side seen from the camera 2), the connection deciding unit 4c makes a decision that the passenger wearing the headphones 8b sits on the rear seat facing the right seat display 7b and wants to view the contents reproduced by the right seat display 7b, and instructs the audio communication unit 5c to connect the headphones 8b to the audio channel for the right seat display 7b.

When identifying the headphones 8b using the ID information (ID=2), the audio communication unit 5c connects the audio channel for the right seat display 7b to the headphones 8b in accordance with the instruction from the connection deciding unit 4c (step ST6c-1). Thus, the audio signal of the audio channel for the right seat display 7b reproduced by the rear seat AV reproducing unit 6 is transmitted to the headphones 8b by wireless communications via the audio communication unit 5c.

On the other hand, when the LED blinking at 50 Hz is in the image area corresponding to the right rear seat (step ST5c: right side seen from the camera 2), the connection deciding unit 4c makes a decision that the passenger wearing the headphones 8b sits on the rear seat facing the left seat display 7a and wants to view the contents reproduced by the left seat display 7a, and instructs the audio communication unit 5c to connect the headphones 8b to the audio channel for the left seat display 7a.

When identifying the headphones 8b using the ID information (ID=2), the audio communication unit 5c connects the audio channel for the left seat display 7a to the headphones 8b in accordance with the instruction from the connection deciding unit 4c (step ST6c-2). Thus, the audio signal of the audio channel for the left seat display 7a reproduced by the rear seat AV reproducing unit 6 is transmitted to the headphones 8b by wireless communications via the audio communication unit 5c.

As described above, according to the present embodiment 5, it comprises the LEDs provided on the headphones 8a and 8b, respectively, and the LED blinking units 10a and 10b provided on the headphones 8a and 8b for blinking the LEDs on the headphones 8a and 8b at different frequencies, wherein the image recognizing unit 3c executes image recognition of the LEDs, which serve as the different identification marks and are blinked by the LED blinking units 10a and 10b, in the shot image taken with the camera 2, and calculates the coordinate positions of the different identification marks in the shot image. This enables the passengers wearing the headphones 8a and 8b to use the right and left reproduction series simultaneously.

Embodiment 6

The embodiment 6 has identification marks each composed of an LED and alters the lighting timing of the LED for each headphones, thereby realizing the individual identification marks of the foregoing embodiment 4.

Figure 17:
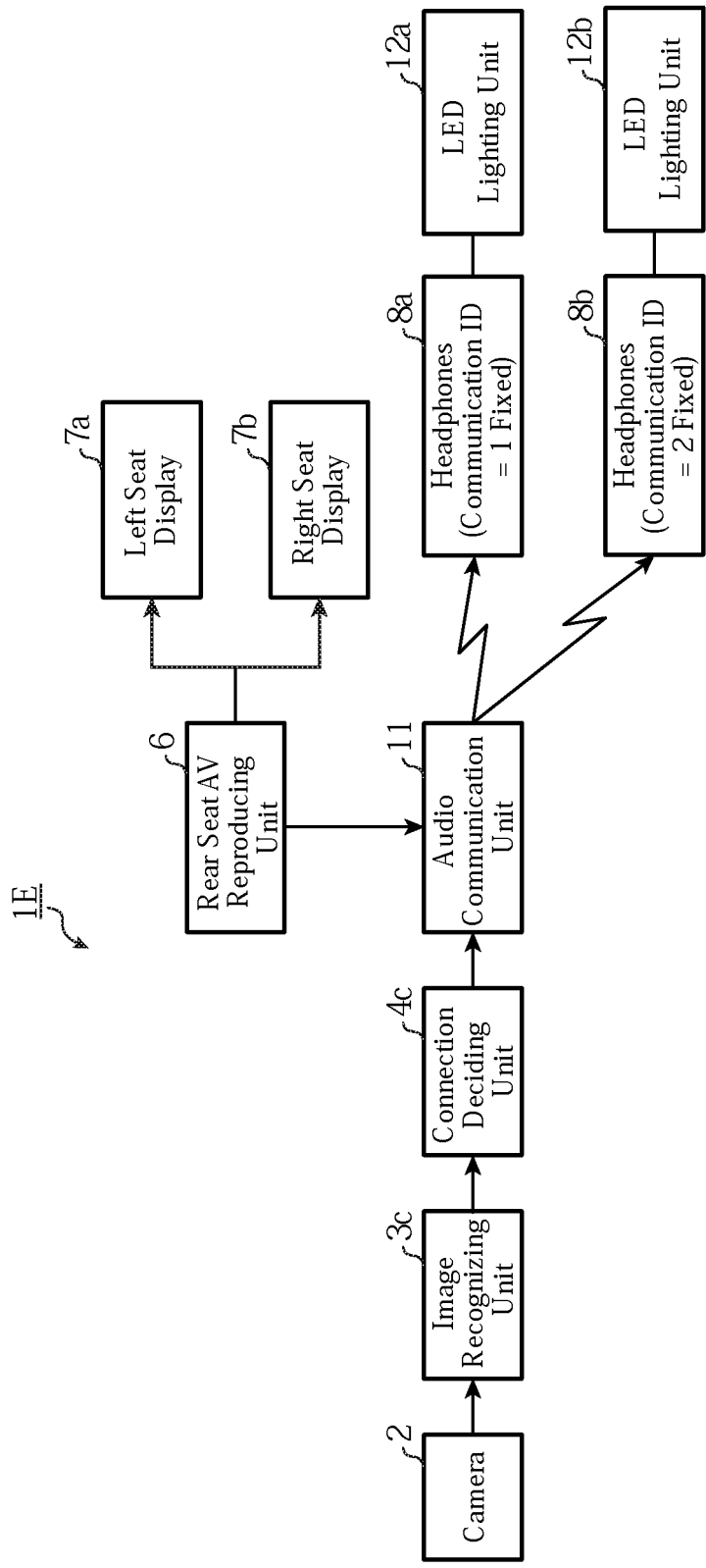
FIG. 17 is a block diagram showing a configuration of an AV system of an embodiment 6 in accordance with the present invention.

FIG. 17 is a block diagram showing a configuration of the AV system of the embodiment 6 in accordance with the present invention, which shows a case where the present invention is applied to an RSE system comprising two reproduction series capable of reproducing different videos and audios with displays mounted on right and left seats of a vehicle.

As shown in FIG. 17, in the RSE system 1E, the left seat display 7a and right seat display 7b reproduce videos, and the headphones 8a or 8b corresponding to one of the displays 7a and 7b are supplied with an audio correspond to the display contents of the display. It comprises the camera 2, the image recognizing unit 3c, the connection deciding unit 4c, an audio communication unit 11 and the rear seat AV reproducing unit 6 as its components.

As the audio communication unit of the foregoing embodiment 5, the audio communication unit 11 is a component that has ID information (ID=1) unique to the headphones 8a and ID information (ID=2) unique to the headphones 8b registered therein as ID information for identifying the headphones to be connected via wireless communications, establishes a connection between the headphones 8a or 8b identified using the ID information and the audio channel corresponding to the decision result of the connection deciding unit 4b, and transmits the audio signal reproduced by the rear seat AV reproducing unit 6 to the headphones 8a or 8b by the wireless communications.

In addition, when reproducing video and audio contents by the RSE system 1E, the audio communication unit 11 transmits an LED lighting command for turning on the LED provided on each of the headphones 8a and 8b at different timing.

LED lighting units 12a and 12b are components for turning on the LEDs which are provided on the headphones 8a and 8b and serve as the identification marks 9a and 9b, respectively. In the embodiment 6, the audio communication unit 11 transmits the LED lighting command to the LED lighting unit 12a and LED lighting unit 12b at different timings so that the LED lighting units 12a and 12b turn on the LEDs at timings they receive the LED lighting command. This enables the LEDs provided on the headphones 8a and 8b to function as the different identification marks 9a and 9b.

Incidentally, as for the other components 2, 6, 7a and 7b, they have the same constructions as their counterparts described in the foregoing embodiment 1 with reference to FIG. 1.

Next, the operation will be described.

Figure 18:
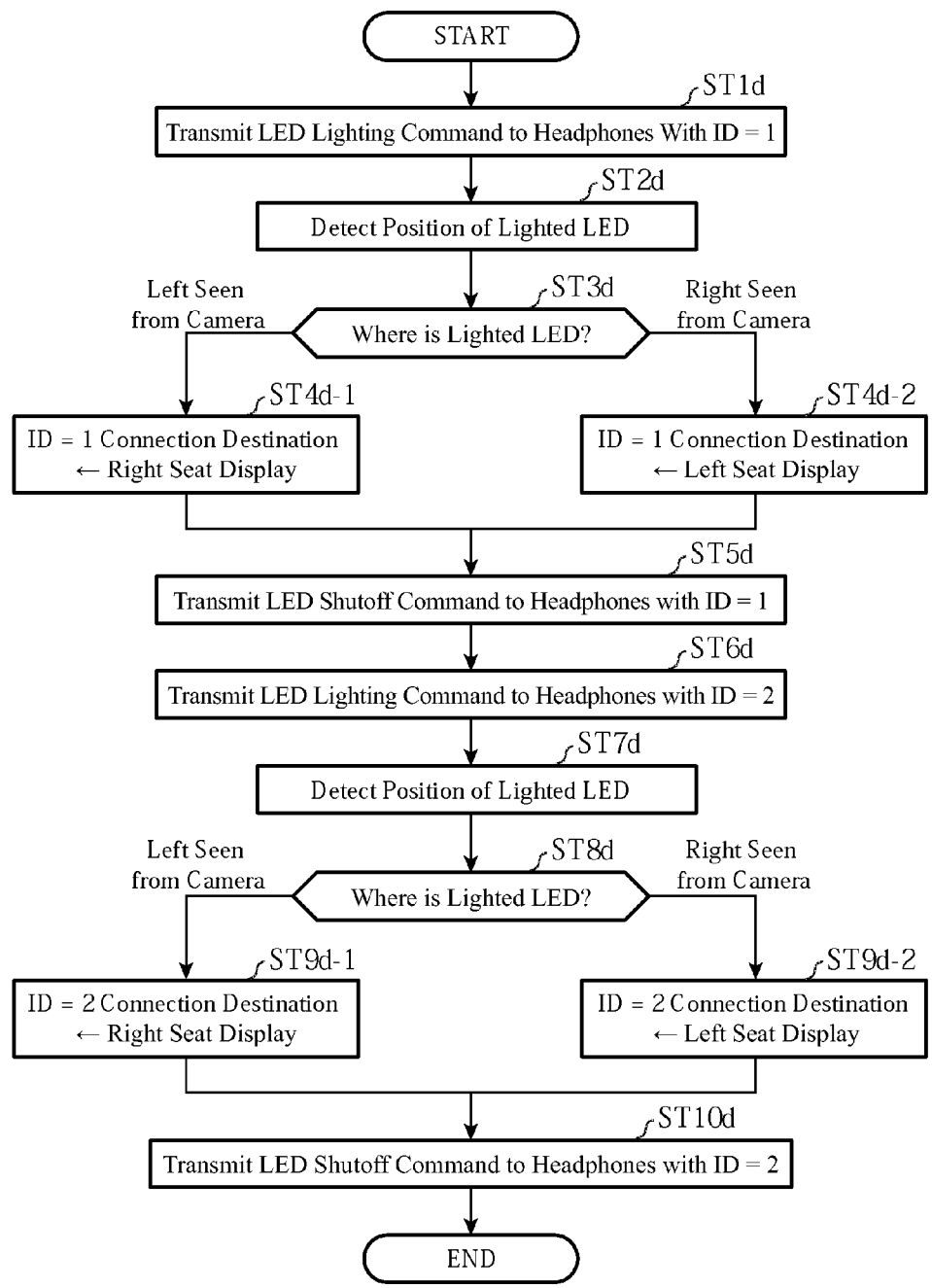
FIG. 18 is a flowchart showing a flow of the operation of the AV system of the embodiment 6.

FIG. 18 is a flowchart showing a flow of the operation of the AV system of the embodiment 6, which shows details of the processing of deciding as to which one of the audio channels for the displays is to be connected to the headphones 8a or 8b. Details of the processing will be described along the line of FIG. 18.

A passenger wearing the headphones 8a or a passenger wearing the headphones 8b sits on the rear seat facing the left seat display 7a or the right seat display 7b, and instructs the RSE system 1E to reproduce the content data using an input device not shown.

In response to it, the audio communication unit 11 identifies the headphones 8a using the ID information (ID=1), and transmits the LED lighting command to the headphones 8a (step ST1d).

Receiving the LED lighting command from the audio communication unit 11, the LED lighting unit 12a turns on the LED provided on the headphones 8a. Here, the LED provided on the headphones 8b is not lit. After that, the camera 2 shoots the rear seat side and supplies the shot image data to the image recognizing unit 3c.

The image recognizing unit 3c executes image recognition of the shot image data received from the camera 2, calculates in the shot image the coordinate position of the lighting LED serving as the identification mark 9a provided on the headphones 8a, and supplies the calculation result to the connection deciding unit 4c (step ST2d).

The connection deciding unit 4c decides on whether the coordinate position of the lighting LED (identification mark 9a) received from the image recognizing unit 3c is in the image area corresponding to the left rear seat seen from the camera 2 or in the image area corresponding to the right rear seat seen from the camera 2 in the rear seat side shot image taken from the fixed point with the camera 2 (step ST3*d*).

When the lighting LED is in the image area corresponding to the left rear seat (step ST3*d*: left side seen from the camera 2), the connection deciding unit 4*c* makes a decision that the passenger wearing the headphones 8*a* sits on the rear seat facing the right seat display 7*b* and wants to view the contents reproduced by the right seat display 7*b*, and instructs the audio communication unit 11 to connect the headphones 8*a* to the audio channel for the right seat display 7*b*.

When identifying the headphones 8*a* using the ID information (ID=1), the audio communication unit 11 connects the audio channel for the right seat display 7*b* to the headphones 8*a* in accordance with the instruction from the connection deciding unit 4*c* (step ST4*d*-1). Thus, the audio signal of the audio channel for the right seat display 7*b* reproduced by the rear seat AV reproducing unit 6 is transmitted to the headphones 8*a* by wireless communications via the audio communication unit 11.

On the other hand, when the lighting LED is in the image area corresponding to the right rear seat (step ST3*d*: right side seen from the camera 2), the connection deciding unit 4*c* makes a decision that the passenger wearing the headphones 8*a* sits on the rear seat facing the left seat display 7*a* and wants to view the contents reproduced by the left seat display 7*a*, and instructs the audio communication unit 11 to connect the headphones 8*a* to the audio channel for the left seat display 7*a*.

When identifying the headphones 8*a* using the ID information (ID=1), the audio communication unit 11 connects the audio channel for the left seat display 7*a* to the headphones 8*a* in accordance with the instruction from the connection deciding unit 4*c* (step ST4*d*-2). Thus, the audio signal of the audio channel for the left seat display 7*a* reproduced by the rear seat AV reproducing unit 6 is transmitted to the headphones 8*a* by wireless communications via the audio communication unit 11.

After that, the audio communication unit 11 transmits an LED shutoff command to the headphones 8*a* (step ST5*d*). Receiving the LED shutoff command from the audio communication unit 11, the LED lighting unit 12*a* turns off the LED provided on the headphones 8*a*.

Subsequently, the audio communication unit 11 identifies the headphones 8*b* using the ID information (ID=2), and transmits the LED lighting command to the headphones 8*b* (step ST6*d*).

Receiving the LED lighting command from the audio communication unit 11, the LED lighting unit 12*b* turns on the LED provided on the headphones 8*b*. After that, the camera 2 shoots the rear seat side and supplies the shot image data to the image recognizing unit 3*c*.

The image recognizing unit 3*c* executes image recognition of the shot image data received from the camera 2, calculates in the shot image the coordinate position of the lighting LED serving as the identification mark 9*b* provided on the headphones 8*b*, and supplies the calculation result to the connection deciding unit 4*c* (step ST7*d*).

The connection deciding unit 4*c* decides on whether the coordinate position of the lighting LED (identification mark 9*b*) received from the image recognizing unit 3*c* is in the image area corresponding to the left rear seat seen from the camera 2 or in the image area corresponding to the right rear seat seen from the camera 2 in the rear seat side shot image taken from the fixed point with the camera 2 (step ST8*d*).

When the lighting LED is in the image area corresponding to the left rear seat (step ST8*d*: left side seen from the camera 2), the connection deciding unit 4*c* makes a decision that the passenger wearing the headphones 8*b* sits on the rear seat facing the right seat display 7*b* and wants to view the contents reproduced by the right seat display 7*b*, and instructs the audio communication unit 11 to connect the headphones 8*b* to the audio channel for the right seat display 7*b*.

When identifying the headphones 8*b* using the ID information (ID=2), the audio communication unit 11 connects the audio channel for the right seat display 7*b* to the headphones 8*b* in accordance with the instruction from the connection deciding unit 4*c* (step ST9*d*-1). Thus, the audio signal of the audio channel for the right seat display 7*b* reproduced by the rear seat AV reproducing unit 6 is transmitted to the headphones 8*b* by wireless communications via the audio communication unit 11.

On the other hand, when the lighting LED is in the image area corresponding to the right rear seat (step ST8*d*: right side seen from the camera 2), the connection deciding unit 4*c* makes a decision that the passenger wearing the headphones 8*b* sits on the rear seat facing the left seat display 7*a* and wants to view the contents reproduced by the left seat display 7*a*, and instructs the audio communication unit 11 to connect the headphones 8*b* to the audio channel for the left seat display 7*a*.

When identifying the headphones 8*b* using the ID information (ID=2), the audio communication unit 11 connects the audio channel for the left seat display 7*a* to the headphones 8*b* in accordance with the instruction from the connection deciding unit 4*c* (step ST9*d*-2). Thus, the audio signal of the audio channel for the left seat display 7*a* reproduced by the rear seat AV reproducing unit 6 is transmitted to the headphones 8*b* by wireless communications via the audio communication unit 11.

Finally, the audio communication unit 11 transmits an LED shutoff command to the headphones 8*b* (step ST10*d*). Receiving the LED shutoff command from the audio communication unit 11, the LED lighting unit 12*b* turns off the LED provided on the headphones 8*b*.

As described above, according to the present embodiment 6, it comprises the LEDs provided on the headphones 8*a* and 8*b*, respectively, and the LED lighting units 12*a* and 12*b* provided on the headphones 8*a* and 8*b* for turning on or off the LEDs of the headphones 8*a* and 8*b* in response to the lighting or shutoff instruction received from the audio communication unit 11, wherein the image recognizing unit 3*c* executes image recognition of the LED, which is lighting at the shooting timing of the camera 2, as the identification mark 9*a* or 9*b* from among the LEDs provided on the headphones 8*a* and 8*b* in the shot image taken with the camera 2, and calculates the coordinate position of the identification mark 9*a* or 9*b* in the shot image; the connection deciding unit 4*c* decides from the coordinate position of the identification mark 9*a* or 9*b* calculated by the image recognizing unit 3*c* as to which one of the plurality of rear seats the passenger sits on who wears the headphones 8*a* or 8*b* with its LED being lit at the shooting timing of the camera 2; and the audio communication unit 11 transmits to the headphones 8*a* or 8*b* the audio data which is selected from the audio data reproduced by the rear seat AV reproducing unit 6 and corresponds to the video data to be displayed on the display screen facing the rear seat which is decided by the connection deciding unit 4*c* that the passenger sits on, and transmits the lighting or shutoff instruction to the LED lighting unit 12*a* or 12*b* provided on the headphones 8*a* or 8*b* to turn on the LED provided on the headphones 8*a* or 8*b* at different timings. This enables the passengers wearing the headphones 8*a* and 8*b* to use the right and left reproduction series simultaneously. Incidentally, since it is enough to alter the light timing of the LEDs, it is not necessary to alter markings of the individual headphones or to change setting of the blinking frequencies.

Incidentally, the foregoing embodiment 4 to the foregoing embodiment 6 are applicable to any one of the configurations from the foregoing embodiment 1 to the foregoing embodiment 6.

In addition, although the foregoing embodiment 4 to the foregoing embodiment 6 are described by way of example with a single camera and two headphones, they are also applicable to a configuration with two or more cameras or three or more headphones.

Embodiment 7

Figure 19:
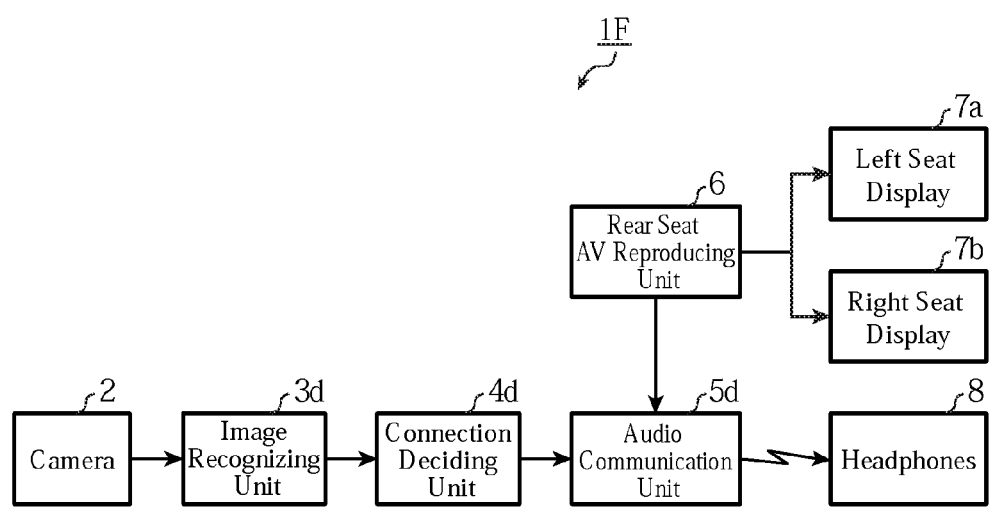
FIG. 19 is a block diagram showing a configuration of an AV system of an embodiment 7 in accordance with the present invention.

FIG. 19 is a block diagram showing a configuration of the AV system of an embodiment 7 in accordance with the present invention, which shows a case of applying the present invention to an RSE system comprising two reproduction series capable of reproducing different videos and audios by displays mounted on right and left seats of a vehicle.

In the RSE system 1F as shown in FIG. 19, the left seat display 7a and right seat display 7b reproduce videos, and the headphones 8 corresponding to one of the displays 7a and 7b are supplied with the audio corresponding to the display contents of the display. It comprises the camera 2, an image recognizing unit 3d, a connection deciding unit 4d, an audio communication unit 5d, and the rear seat AV reproducing unit 6.

The image recognizing unit 3d is a component for executing image recognition of the shot image data received from the camera 2, for calculating the coordinate position of the identification mark 9 provided on the headphones 8 in the shot image, and for identifying on whether a gesture of a passenger is affirmative or negative.

For example, the image recognizing unit 3d has an image pattern corresponding to the identification mark 9 registered therein, and calculates the coordinate position of the identification mark 9 in a shot image by matching the shot image with the image pattern.

As for gestures, likewise, the image recognizing unit 3d has image patterns corresponding to affirmative and negative gestures registered therein, respectively, and distinguishes on whether a passenger makes an affirmative gesture or negative gesture by matching the shot image with the image patterns.

The connection deciding unit 4d is a component for deciding from the coordinate position of the identification mark 9 calculated by the image recognizing unit 3d as to which one of the left and right rear seats the passenger wearing the headphones 8 sits on, that is, which one of the audio channels for the displays 7a and 7b the passenger will connect to the headphones 8. In addition, the connection deciding unit 4d decides from the distinguished result of the image recognizing unit 3d about the gesture of the passenger as to which one of the audio channels for the displays 7a and 7b is to be connected to the headphones 8.

The audio communication unit 5d is a component for establishing a connection between the headphones 8 and the audio channel corresponding to the decision result of the connection deciding unit 4d, followed by transmitting information speech for confirming the decision result to the headphones 8 by wireless communications, and by transmitting the audio signal reproduced by the rear seat AV reproducing unit 6 to the headphones 8 by wireless communications when the image recognizing unit 3d identifies that the response is affirmative (the gesture is affirmative).

Next, the operation will be described.

Figure 20:
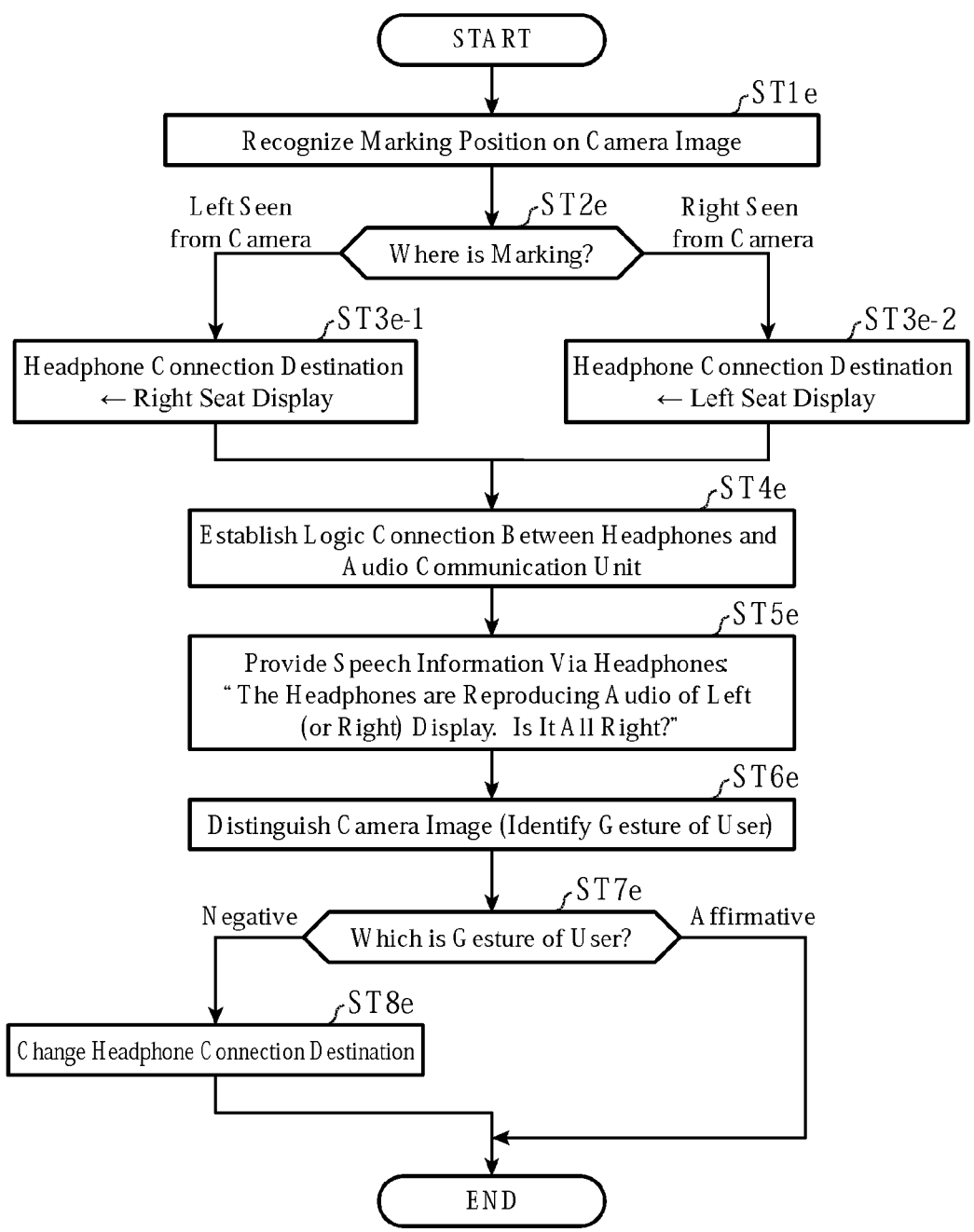
FIG. 20 is a flowchart showing a flow of the operation of the AV system of the embodiment 7.

FIG. 20 is a flowchart showing a flow of the operation of the AV system of the embodiment 7, which shows details of the processing of deciding as to which one of the audio channels for the displays is to be connected to the headphones 8. Details of the processing will be described along the line of FIG. 20.

First, when the passenger wearing the headphones 8 sits on the rear seat facing the left seat display 7a or right seat display 7b and instructs the RSE system 1F to reproduce the content data using an input device not shown, the camera 2 shoots the rear seat side and supplies the shot image data to the image recognizing unit 3d.

The image recognizing unit 3d executes image recognition of the shot image data received from the camera 2, calculates the coordinate position of the identification mark 9 provided on the headphones 8 in the shot image, and supplies the calculation result to the connection deciding unit 4d (step ST1e).

The connection deciding unit 4d decides on whether the coordinate position of the identification mark 9 received from the image recognizing unit 3d is in the image area corresponding to the left rear seat seen from the camera 2 or in the image area corresponding to the right rear seat seen from the camera 2 in the rear seat side shot image taken from the fixed point with the camera 2 (step ST2e).

When the identification mark 9 is in the image area corresponding to the left rear seat (step ST2e: left side seen from the camera 2) the connection deciding unit 4d makes a decision that the passenger wearing the headphones 8 sits on the rear seat facing the right seat display 7b and wants to view the contents reproduced by the right seat display 7b, and instructs the audio communication unit 5d to connect the headphones 8 to the audio channel for the right seat display 7b (step ST3e-1).

Likewise, when the identification mark 9 is in the image area corresponding to the right rear seat (step ST2e: right side seen from the camera 2), the connection deciding unit 4d makes a decision that the passenger wearing the headphones 8 sits on the rear seat facing the left seat display 7a and wants to view the contents reproduced by the left seat display 7a, and instructs the audio communication unit 5d to connect the headphones 8 to the audio channel for the left seat display 7a (step ST3e-2).

When the audio communication unit 5d receives the instruction to connect the headphones 8 to the audio channel for the right seat display 7b at step ST3e-1 or the instruction to connect to the audio channel for the left seat display 7a at step ST3e-2, it establishes a logic connection with the headphones 8 (step ST4e). This causes the audio signal of the audio channel for the right seat display 7b or for the left seat display 7a, which is reproduced by the rear seat AV reproducing unit 6, to be transmitted to the headphones 8 by wireless communications via the audio communication unit 5d.

After that, the audio communication unit 5d transmits speech information registered in advance to the headphones 8 (step ST5e). This causes the information speech such as "The headphones are reproducing the audio for the left (or right) display now. Is it all right?" to be delivered to the passenger via the headphones 8. Receiving the information speech, the passenger makes an affirmative gesture before the camera 2 if the present audio is a desired reproduction series, but a negative gesture before the camera 2 if the present audio is not a desired one. The camera 2 shoots the gesture and supplies the shot image data to the image recognizing unit 3d.

The image recognizing unit 3d executes image recognition of the shot image data received from the camera 2, distinguishes whether the gesture of the passenger is affirmative or negative, and supplies the distinguished result to the connection deciding unit 4d (step ST6e). The connection deciding unit 4*d* decides on whether the distinguished result of the image recognizing unit 3*d* shows an affirmative gesture or a negative gesture (step ST7*e*). If the distinguished result is a negative gesture, the connection deciding unit 4*d* instructs the audio communication unit 5*d* to alter the current audio channel connected to the headphones 8 to the audio channel for the other display. Incidentally, a configuration is also possible which changes the audio channel for the other display which is decided by the connection deciding unit 4*d* to the audio channel for the display facing the rear seat as to which a decision is made again.

In accordance with the instruction from the connection deciding unit 4*d*, the audio communication unit 5*d* severs the connection between the headphones 8 and the current audio channel, and connects the audio channel for the other display to the headphones 8 (step ST8*e*). This enables the audio signal of the audio channel for the other display, which is reproduced by the rear seat AV reproducing unit 6, to be transmitted to the headphones 8 by wireless communications via the audio communication unit 5*d*. Thus, the audio signal of the audio channel for the other display is output through the headphones 8. In contrast, if the distinguished result is an affirmative gesture, the processing is terminated. In this case, the audio signal of the current audio channel is continually output through the headphones 8.

Incidentally, as for the decision of the gesture at step ST7*e*, it can be made as to a motion video. For example, after outputting the speech information, the image recognizing unit 3*d* acquires a video from the camera 2 for a prescribed period, and recognizes a gesture by comparing a characteristic pattern in the image data at every prescribed moment with a reference patter stored in advance.

As described above, according to the present embodiment 7, when the connection deciding unit 4*d* decides the rear seat on which the passenger wearing the headphones 8 sits, the audio communication unit 5*d* transmits the speech information to the headphones 8 so that the passenger can confirm the decision result, transmits, when an affirmative response to the decision result is received from the passenger, the audio data corresponding to the video data to be displayed on the screen facing the rear seat of the decision result to the headphones 8 to output the audio, and transmits, when a negative response to the decision result is received from the passenger, the audio data corresponding to the video data to be displayed on the screen facing the rear seat which is decided again from among the rear seats other than the rear seat of the decision result of the connection deciding unit 4*d* to the headphones 8 to output the audio. This makes it possible to implement a more user-friendly man-machine interface.

Incidentally, although the foregoing embodiment 7 shows a case where the passenger responds by gesture to the speech information, a configuration is also possible which provides a man-machine interface for making a response using an input device and display, and enables a passenger to directly input a response whether to enable the output of the current audio or not.

Embodiment 8

Figure 21:
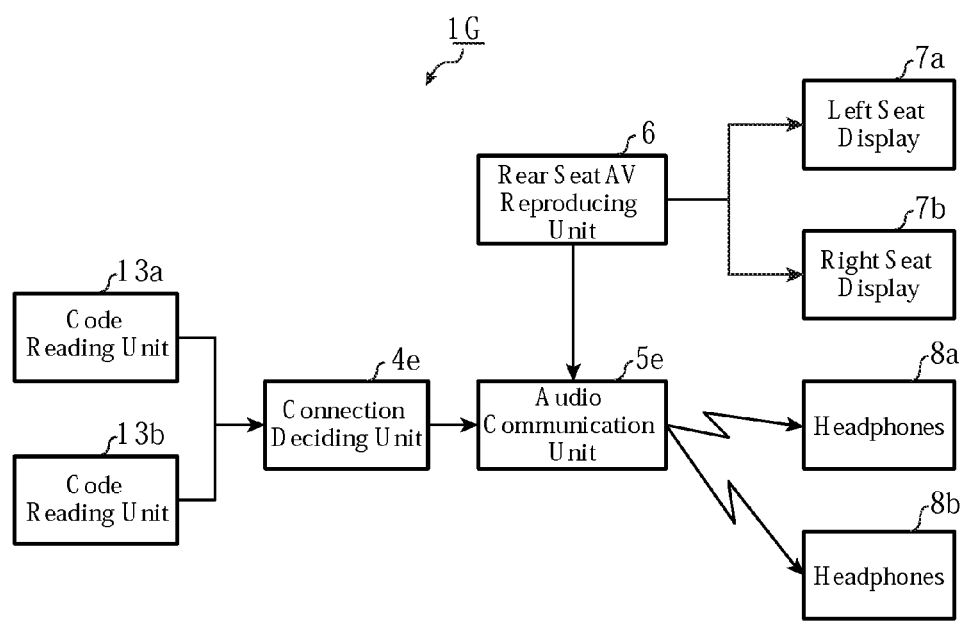
FIG. 21 is a block diagram showing a configuration of an AV system of an embodiment 8 in accordance, with the present invention.

FIG. 21 is a block diagram showing a configuration of the AV system of an embodiment 8 in accordance with the present invention, which shows a case of applying the present invention to an RSE system comprising two reproduction series capable of reproducing different videos and audios by displays mounted on right and left seats of a vehicle.

In the RSE system 1G as shown in FIG. 21, the left seat display 7*a* and right seat display 7*b* reproduce videos, and the headphones 8*a* or 8*b* corresponding to one of the displays 7*a* and 7*b* are supplied with the audio corresponding to the display contents of the display. It comprises code reading units 13*a* and 13*b*, a connection deciding unit 4*e*, an audio communication unit 5*e*, and the rear seat AV reproducing unit 6 without the image recognizing unit the foregoing embodiment 1 to the foregoing embodiment 7 comprises.

Incidentally, the headphones 8*a* and 8*b* have ID information which is unique to each of them and is provided as a two-dimensional information code such as a QR code (registered trademark, no reference to which will be made from now on).

The connection deciding unit (deciding unit) 4*e* is a component for deciding from the two-dimensional information code read with the code reading unit 13*a* or 13*b* as to which one of the left and right rear seats the passenger wearing the headphones 8*a* or 8*b* provided with the two-dimensional information code sits on, that is, which one of the audio channels for the displays 7*a* and 7*b* the passenger will connect to the headphones 8*a* or 8*b*.

The audio communication unit 5*e* is a component that has ID information (ID=1) unique to the headphones 8*a* and ID information (ID=2) unique to the headphones 8*b* registered as the ID information for identifying the headphones to be connected to the wireless communications, that establishes a connection between the headphones 8*a* or 8*b* identified using the ID information and the audio channel corresponding to the decision result of the connection deciding unit 4*e*, and that transmits the audio signal reproduced by the rear seat AV reproducing unit 6 to the headphones 8*a* or 8*b* by wireless communications.

The code reading unit 13*a* is a component that is provided for the left seat display 7*a*, that reads the two-dimensional information code added to the headphones 8*a* or 8*b*, and that supplies the connection deciding unit 4*e* with information indicating the headphones 8*a* or 8*b* from which it reads the two-dimensional information code. Likewise, the code reading unit 13*b* is a component that is provided for the right seat display 7*b*, that reads the two-dimensional information code added to the headphones 8*a* or 8*b*, and that supplies the connection deciding unit 4*e* with information indicating the headphones 8*a* or 8*b* from which it reads the two-dimensional information code.

Next, the operation will be described.

Figure 22:
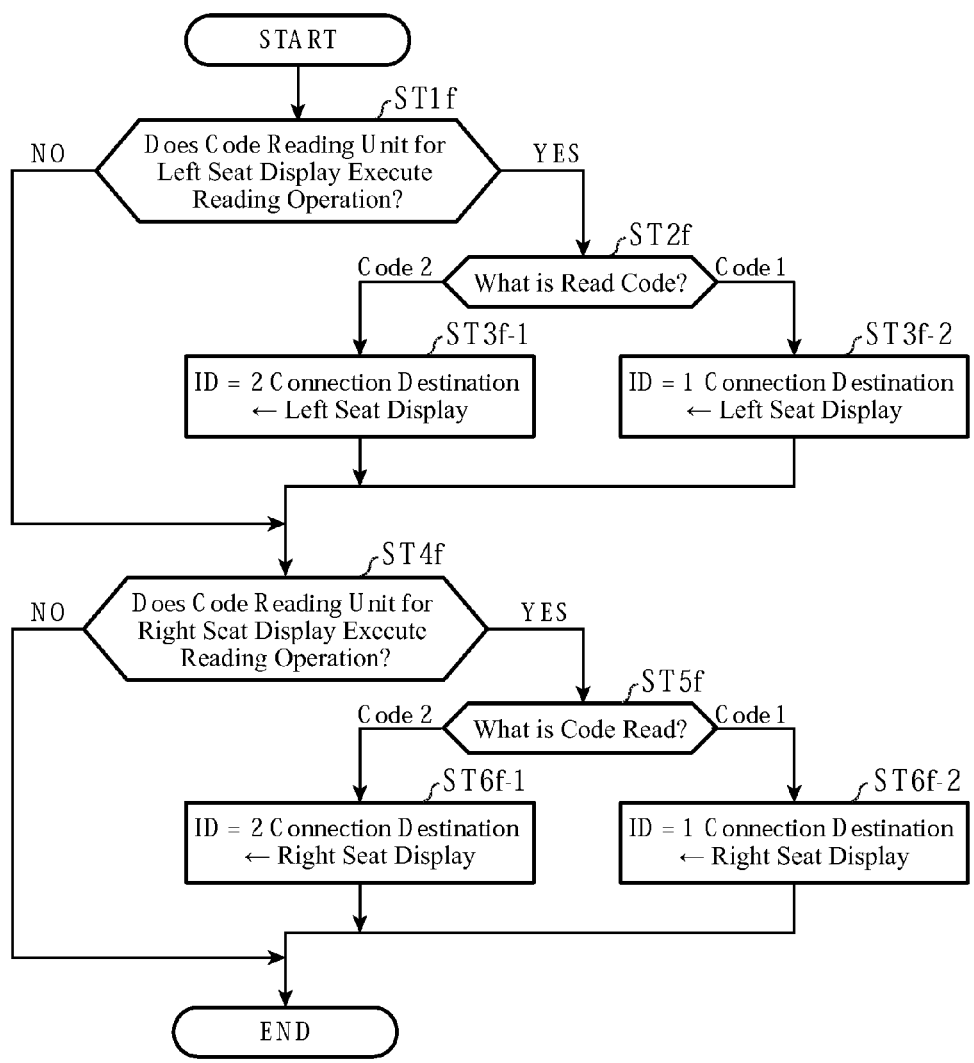
FIG. 22 is a flowchart showing a flow of the operation of the AV system of the embodiment 8.

FIG. 22 is a flowchart showing a flow of the operation of the AV system of the embodiment 8, which shows details of the processing of deciding as to which one of the audio channels for the displays is to be connected to the headphones 8*a* or 8*b*. Details of the processing will be described along the line of FIG. 22.

A passenger wearing the headphones 8*a* or 8*b* sits on the rear seat facing the left seat display 7*a* or the right seat display 7*b*, and causes one of the code reading units 13*a* and 13*b* to read the two-dimensional information code added to his or her own headphones.

For example, when the passenger who sits on the rear seat facing the left seat display 7*a* wants to view the contents to be reproduced by the left seat display 7*a*, the passenger causes the code reading unit 13*a* corresponding thereto to read the two-dimensional information code. On the other hand, when the passenger who sits on the rear seat facing the right seat display 7*b* wants to view the contents to be reproduced by the right seat display 7*b*, the passenger causes the code reading unit 13*b* corresponding to the right seat display 7*b* to read the two-dimensional information code.

First, the code reading unit 13*a* decides on whether it carries out its reading operation of the two-dimensional information code or not (step ST1*f*). Here, unless the reading operation of the code reading unit 13*a* is made (NO at step ST1*f*), the processing proceeds to step ST4*f*. In contrast, if the reading operation of the code reading unit 13*a* is made (YES at step ST1*f*), the code reading unit 13*a* decides on whether the two-dimensional information code read is a code 1 indicating the ID information (ID=1) or a code 2 indicating the ID information (ID=2) (step ST2*f*).

When the two-dimensional information code read is the code 2 indicating the ID information (ID=2), the code reading unit 13*a* notifies the connection deciding unit 4*e* of that. When the connection deciding unit 4*e* is informed of the code 2 by the code reading unit 13*a*, it decides that the passenger wearing the headphones 8*b* wants to view the contents to be reproduced by the left seat display 7*a*, and instructs the audio communication unit 5*e* to connect the headphones 8*b* to the audio channel for the left seat display 7*a*.

The audio communication unit 5*e*, which identifies the headphones 8*b* using the ID information (ID=2), connects the audio channel for the left seat display 7*a* to the headphones 8*b* in accordance with the instruction from the connection deciding unit 4*e* (step ST3*f*-1). Thus, the audio signal of the audio channel for the left seat display 7*a*, which is reproduced by the rear seat AV reproducing unit 6, is transmitted to the headphones 8*b* by wireless communications via the audio communication unit 5*e*.

On the other hand, when the two-dimensional information code read is the code 1 indicating the ID information (ID=1), the code reading unit 13*a* notifies the connection deciding unit 4*e* of that. When the connection deciding unit 4*e* is informed of the code 1 by the code reading unit 13*a*, it decides that the passenger wearing the headphones 8*a* wants to view the contents to be reproduced by the left seat display 7*a*, and instructs the audio communication unit 5*e* to connect the headphones 8*a* to the audio channel for the left seat display 7*a*.

The audio communication unit 5*e*, which identifies the headphones 8*a* using the ID information (ID=1), connects the audio channel for the left seat display 7*a* to the headphones 8*a* in accordance with the instruction from the connection deciding unit 4*e* (step ST3*f*-2). Thus, the audio signal of the audio channel for the left seat display 7*a*, which is reproduced by the rear seat AV reproducing unit 6, is transmitted to the headphones 8*a* by wireless communications via the audio communication unit 5*e*.

If the reading operation of the code reading unit 13*a* at step ST1*f* is not carried out or if the processing at step ST3*f*-1 or 3*f*-2 is completed, the code reading unit 13*b* decides on whether it carries out its reading operation of the two-dimensional information code or not (step ST4*f*). Here, unless the reading operation of the code reading unit 13*b* is made (NO at step ST5*f*), the processing is terminated. In contrast, if the reading operation of the code reading unit 13*b* is made (YES at step ST4*f*), the code reading unit 13*b* decides on whether the two-dimensional information code read is the code 1 indicating the ID information (ID=1) or the code 2 indicating the ID information (ID=2) (step ST5*f*).

When the two-dimensional information code read is the code 2 indicating the ID information (ID=2), the code reading unit 13*b* notifies the connection deciding unit 4*e* of that. When the connection deciding unit 4*e* is informed of the code 2 by the code reading unit 13*b*, it decides that the passenger wearing the headphones 8*b* wants to view the contents to be reproduced by the right seat display 7*b*, and instructs the audio communication unit 5*e* to connect the headphones 8*b* to the audio channel for the right seat display 7*b*.

The audio communication unit 5*e*, which identifies the headphones 8*b* using the ID information (ID=2), connects the audio channel for the right seat display 7*b* to the headphones 8*b* in accordance with the instruction from the connection deciding unit 4*e* (step ST6*f*-1). Thus, the audio signal of the audio channel for the right seat display 7*b*, which is reproduced by the rear seat AV reproducing unit 6, is transmitted to the headphones 8*b* by wireless communications via the audio communication unit 5*e*.

On the other hand, when the two-dimensional information code read is the code 1 indicating the ID information (ID=1), the code reading unit 13*b* notifies the connection deciding unit 4*e* of that. When the connection deciding unit 4*e* is informed of the code 1 by the code reading unit 13*b*, it decides that the passenger wearing the headphones 8*a* wants to view the contents to be reproduced by the right seat display 7*b*, and instructs the audio communication unit 5*e* to connect the headphones 8*a* to the audio channel for the right seat display 7*b*.

The audio communication unit 5*e*, which identifies the headphones 8*a* using the ID information (ID=1), connects the audio channel for the right seat display 7*b* to the headphones 8*a* in accordance with the instruction from the connection deciding unit 4*e* (step ST6*f*-2). Thus, the audio signal of the audio channel for the right seat display 7*b*, which is reproduced by the rear seat AV reproducing unit 6, is transmitted to the headphones 8*a* by wireless communications via the audio communication unit 5*e*.

As described above, according to the present embodiment 8, it comprises the code reading units 13*a* and 13*b* which are provided for the displays 7*a* and 7*b*, respectively, and read the two-dimensional information code uniquely attached to each headphones; decides that the rear seat that faces the display screen of the display 7*a* or 7*b* corresponding to the code reading unit 13*a* or 13*b* which reads the two-dimensional information code is the rear seat on which the passenger wearing the headphones 8*a* or 8*b* provided with the two-dimensional information code sits; and transmits the audio data corresponding to the video data to be displayed on the screen facing the rear seat, as to which the decision is made that the passenger sits on, to the headphones 8*a* or 8*b* the passenger wears, thereby outputting the audio.

Thus, the passenger can select the audio channel only by showing the two-dimensional information code (QR code, for example) of the headphones to the code reading unit 13*a* or 13*b*, which can obviate the necessity of a manual switching operation. In addition, it can simplify the hardware construction because it can eliminate the switch of the headphones. In particular, there are some cases where the configuration employing the code reading units 13*a* and 13*b* for reading the two-dimensional information code like a QR code is cheaper than the configuration employing the image recognizing unit 3 in combination with the camera 2. In such a case, it can achieve cost reduction.

Although the foregoing embodiments 1 to 8 are described by way of example that employs the headphones 8, 8*a* or 8*b* as a device for listening to the contents to be reproduced on the display 7*a* or 7*b*, a configuration is also possible which adds the identification mark described in the foregoing embodiments 1 to 7 to 3D glasses for viewing 3D video or to a remote control for controlling the reproduction of contents, or provides the two-dimensional information code shown in the foregoing embodiment 8 to them to distinguish which one of them is used for viewing the contents that are reproduced by the reproduction series corresponding to the display 7*a* or 7*b*.

Incidentally, it is to be understood that a free combination of the individual embodiments, variations of any components of the individual embodiments or removal of any components of the individual embodiments are possible within the scope of the present invention.

INDUSTRIAL APPLICABILITY

An AV system in accordance with the present invention can automatically identify the device corresponding to the individual reproduction series without impairing the versatility of the device used for the video-audio reproduction of the individual reproduction series in the AV system with a plurality of video-audio reproduction series. Accordingly, it is effectively used as an onboard RSE system, for example.

What is claimed is:

1. An AV system comprising:
 a plurality of display units with their display screens being directed to a plurality of seats;
 an image recognizing unit for executing image recognition of an identification mark provided on an audio output device in a shot image taken with a camera unit for shooting the seats to which the camera face, and for calculating a coordinate position of the identification mark in the shot image;
 a deciding unit for deciding from the coordinate position of the identification mark calculated by the image recognizing unit as to which one of the plurality of seats a user wearing the audio output device sits on;
 an AV reproducing unit for reproducing video data and audio data; and
 an audio communication unit for transmitting, from among the audio data reproduced by the AV reproducing unit, the audio data which corresponds to the video data to be displayed on the display screen facing the seat as to which the deciding unit decides that the user sits on, to the audio output device the user wears to be produced as audio output, wherein the AV system further comprising:
 a plurality of identification marks provided on the audio output device at places on a plane perpendicular to the face direction of the user, wherein
  the image recognizing unit executes image recognition of the plurality of identification marks provided on the audio output device in the shot image taken with the camera unit, and calculates a distance between the plurality of the coordinate positions of the plurality of identification marks in the shot image;
  the deciding unit decides from the coordinate positions of the identification marks calculated by the image recognizing unit as to which one of the plurality of seats the user wearing the audio output device sits on, and decides from a comparison result of the distance between the plurality of identification marks with a prescribed threshold as to which one of the display screens of the plurality of display units the face of the user sitting on the seat decided is directed to; and
  the audio communication unit transmits, from among the audio data reproduced by the AV reproducing unit, the audio data corresponding to the video data to be displayed on the display screen, as to which the deciding unit decides that the face of the user is directed to, to the audio output device the user wears to be produced as the audio output; and
 a plurality of camera units, wherein
  the deciding unit decides in shot images taken with the plurality of camera units as to which one of the plurality of seats the user wearing the audio output device sits on from the coordinate positions of the plurality of identification marks calculated by the image recognizing unit, and decides as to which one of the display screens of the plurality of display units the face of the user is directed to from a comparison result of the distance between the plurality of identification marks in each of the shot images taken with the plurality of camera units with a prescribed threshold.

2. The AV system according to claim 1, wherein the camera units are provided to the display units on a one-to-one basis.

3. The AV system according to claim 1, comprising:
 a plurality of audio output devices provided with different identification marks, respectively, wherein
 the image recognizing unit executes image recognition of the different identification marks, and calculates the coordinate positions of the different identification marks in the shot image taken with the camera unit;
 the deciding unit decides, from the coordinate positions of the different identification marks, which are calculated by the image recognizing unit, as to which of the plurality of seats a plurality of users each wearing one of the plurality of audio output devices sit on, respectively; and
 the audio communication unit transmits, from among the audio data reproduced by the AV reproducing unit, the audio data, which correspond to the video data to be displayed on the display screens facing the plurality of seats, respectively, as to which the deciding unit decides that the plurality of users sit on, respectively, to the plurality of audio output devices to be produced as the audio output, respectively.

4. The AV system according to claim 3, wherein
 the different identification marks are prints that are applied on the audio output devices and are different in color or shape.

5. The AV system according to claim 3, comprising:
 LED elements provided on the plurality of audio output devices, respectively; and
 LED blinking units provided in the plurality of audio output devices for blinking the LED elements of the audio output devices at different frequencies, respectively, wherein
 the image recognizing unit executes image recognition of the LED elements, which are made blinking by the LED blinking units as the different identification marks, in the shot image taken with the camera unit, and calculates the coordinate positions of the different identification marks in the shot image.

6. The AV system according to claim 1, comprising:
 LED elements provided on the plurality of audio output devices, respectively; and
 LED lighting units provided in the plurality of audio output devices, respectively, for turning on or off the LED element of each of the audio output devices in response to a lighting or shutoff command received from the audio communication unit, wherein
 the image recognizing unit executes image recognition of the LED element that is lighting at shooting timing of the camera unit as the identification mark from among the LED elements provided on the plurality of audio output devices, respectively, in the shot image taken with the camera unit, and calculates the coordinate position of the identification mark in the shot image;
 the deciding unit decides from the coordinate position of the identification mark calculated by the image recognizing unit as to which one of the plurality of seats the user wearing the audio output device with its LED element being lit at the shooting timing of the camera unit sits on; and the audio communication unit transmits, from among the audio data reproduced by the AV reproducing unit, the audio data corresponding to the video data to be displayed on the display screen facing the seat, as to which the deciding unit decides that the user sits on, to the audio output device to be produced as the audio output, and turns on the LED elements provided on the plurality of audio output devices, respectively, at different timings by transmitting the lighting or shutoff command to the LED lighting units provided in the plurality of audio output devices, respectively.

7. The AV system according to claim 1, wherein the audio communication unit:
- transmits, when the deciding unit decides the seat on which the user wearing the audio output device sits, speech information for causing the user to confirm the decision result to the audio output device;
- transmits, when receiving from the user an affirmative response to the decision result, the audio data corresponding to the video data to be displayed on the display screen facing the seat associated with the decision result to the audio output device to be produced as the audio output; and
- transmits, when receiving from the user a negative response to the decision result, the audio data corresponding to the video data to be displayed on the display screen facing a seat, which the deciding unit decides again from among the plurality of seats except for the seat associated with the negative response to the decision result, to the audio output device to be produced as the audio output.

* * * * *